(12) United States Patent
Roussopoulos et al.

(10) Patent No.: US 7,133,876 B2
(45) Date of Patent: Nov. 7, 2006

(54) DWARF CUBE ARCHITECTURE FOR REDUCING STORAGE SIZES OF MULTIDIMENSIONAL DATA

(75) Inventors: Nicholas Roussopoulos, Silver Spring, MD (US); John Sismanis, Silver Spring, MD (US); Antonios Deligiannakis, Silver Spring, MD (US)

(73) Assignee: The University of Maryland College Park, College Park, MD (US)

( * ) Notice: Subject to any disclaimer, the term of this patent is extended or adjusted under 35 U.S.C. 154(b) by 836 days.

(21) Appl. No.: 10/157,960

(22) Filed: May 31, 2002

(65) Prior Publication Data

US 2003/0126143 A1     Jul. 3, 2003

Related U.S. Application Data

(60) Provisional application No. 60/297,249, filed on Jun. 12, 2001.

(51) Int. Cl.
*G06F 17/30* (2006.01)

(52) U.S. Cl. .................................. 707/102

(58) Field of Classification Search ........... 707/1–10, 707/100–104.1, 200–206; 704/260
See application file for complete search history.

(56) References Cited

U.S. PATENT DOCUMENTS

| | | | |
|---|---|---|---|
| 5,359,724 A | 10/1994 | Earle | 395/425 |
| 5,930,756 A * | 7/1999 | Mackie et al. | 704/260 |
| 6,141,655 A | 10/2000 | Johnson et al. | 707/2 |
| 6,549,907 B1 * | 4/2003 | Fayyad et al. | 707/101 |
| 6,633,882 B1 * | 10/2003 | Fayyad et al. | 707/101 |
| 2005/0065910 A1 * | 3/2005 | Welton et al. | 707/2 |

OTHER PUBLICATIONS

Acharya, S., Gibbons, P.B., and Poosala, V. Congressional Samples for Approximate Answering of Group-By Queries. In Proceedings of ACM SIGMOD International Conference on Management of Data, pp. 487-498, Dallas, Texas, 2000.
Agarwal, S. et al., "On the computation of multidimensional aggregates." In *Proc. of the 22nd VLDB Conf.*, pp. 506-521, 1996; S. Sarawagi et al., "On computing the data cube," Technical Report RJ10026, IBM Almaden Research Center, San Jose, CA, 1996.
Baralis, E., Paraboschi, S., and Teniente, E. Materialized View Selection in a Multidimensional Database. In *Proc. of VLDB Conf.*, pp. 156-165, Athens, Greece, Aug. 1997; H. Gupta.
Beyer, K. and Ramakrishnan, R.. Bottom-Up Computation of Sparse and Iceberg CUBEs In *Proc. of the ACM SIGMOD Conf.*, pp. 359-370, Philadelphia, PA, USA, 1999).
Blackard, Jock A., "The Forest CoverType Dataset." ftp://ftp.ics.uci.edu/pub/machine-learning-databases/covtype.
Fang, M. et al., "Computing Iceberg Queries Efficiently," In *Proc. of the 24th VLDB Conf.*, pp. 299-310, Aug. 1998.

(Continued)

*Primary Examiner*—Diane Mizrahi
(74) *Attorney, Agent, or Firm*—Edell, Shapiro & Finnan LLC

(57) ABSTRACT

The invention relates to data warehouses and the ability to create and maintain data cubes of multi-dimensional data. More specifically, the invention pertains to data cube architectures that permit significant reduction of storage, exhibit very efficient retrieval and provide a very efficient incremental update of the data cubes.

49 Claims, 9 Drawing Sheets

OTHER PUBLICATIONS

Gibbons, P.B. and Matias, Y.. New Sampling-Based Summary Statistics for Improving Approximate Query Answers. In Proceedings ACM SIGMOD International Conference on Management of Data, pp. 331-342, Seattle, Washington, Jun. 1998.

Gray, J. et al., "Data Cube: A Relational Aggregation Operator Generalizing Group-By, Cross-Tab, and Sub-Totals;" In *Proc. of the 12th ICDE*, pp. 152-159, New Orleans, Feb. 1996.

Gupta, H., Harinarayan, V., Rajaraman, A., and Ullman, J. Index Selection for OLAP. In *Proc. of ICDE Conf.*, pp. 208-219, Burmingham, UK, Apr. 1997.

Gupta, H. Selections of Views to Materialize in a Data Warehouse. In *Proc. of ICDT Conf.*, pp. 98-112, Delphi, Jan. 1997.

Hahn, J. et al., Edited synoptic cloud reports from ships and land stations over the globe. http://cdiac.esd.ornl.gov/cdiac/ndps/ndp026b.html.

Harinarayan, V. et al., "Implementing Data Cubes Efficiently," In *Proc. of ACM SIGMOD*, pp. 205-216, Montreal, Canada, Jun. 1996).

Kotidis, Y. and Roussopoulos, N. "An Alternative Storage Organization for ROLAP Aggregate Views Based on Cubetrees." In Proceedings of the ACM SIGMOD International Conference on Management of Data, pp. 249-258, Seattle, Washington, Jun. 1998.

OLAP Council. APB-1 Benchmark. http://www.olapcouncil.org/research/bmarkco.htm, 1998.

Ross, K.A. and Srivastana, D., Fast Computation of Sparse Datacubes, In Proc of the $23^{rd}$ VLDB Conf., pp. 116-125, Athens, Greece, 1997.

Roussopoulos, N., et al., "Cubetree: Organization of and Bulk Incremental Updates on the Data Cube," In Proceedings of the ACM SIGMOD International Conference on Management of Data, pp. 89-99, Tucson, Arizona, May 1997.

Shanmugasundaram, J. et al., "Compressed Data Cubes for OLAP Aggregate Query Approximation on Continuous Dimensions," In *Proc. of the Intl. Conf. on Knowledge Discovery and Data Mining (KDD99)*, 1999.

Shukla, A., Deshpande, P.M., and Naughton, J.F. Materialized View Selection for Multidimensional Datasets. In *Proc. of the 24th VLDB Conf.*, pp. 488-499, New York City, New York, Aug. 1998.

Zhao, Y., Deshpande, P.M., and Naughton, J.F.; "An array-based algorithm for simultaneous multidimensional aggregates;" In *Proc. of the ACM SIGMOD Conf.*, pp. 159-170, 1997.

* cited by examiner

```
SELECT SUM(Price)
FROM Sales
WHERE     Customer = C1
AND       Product = X
```

```
SELECT SUM(Price)
FROM Sales
WHERE     Store = S2
AND       Customer = C1
AND       Product = X
``` to next dimension    to next dimension level

DWARF CUBE ARCHITECTURE FOR REDUCING STORAGE SIZES OF MULTIDIMENSIONAL DATA

CROSS-REFERENCE TO RELATED APPLICATIONS

This Application claims priority to U.S. Patent Application Ser. No. 60/297,249, filed Jun. 12, 2001.

FIELD OF THE INVENTION

The invention relates to data warehouses and the ability to create and maintain data cubes of multi-dimensional data. More specifically, the invention pertains to data cube architectures that permit significant reduction of storage, exhibit very efficient retrieval and provide a very efficient incremental update of the data cubes.

BACKGROUND OF THE INVENTION

On Line Analytical Processing (OLAP) provides the capability to do analysis, projections, and reporting on any number of dimensions and provide views of the data that otherwise are not easy to observe. This "slice and dice" and the "drill-up/down" of the data is critical to businesses and organizations for intelligent decision support.

Several forms of OLAP have been described: Multi-Dimensional OLAP (MOLAP), Relational OLAP (ROLAP), Desktop OLAP (DOLAP), and Integrated OLAP (IOLAP). The Multi-Dimensional OLAP uses a multi-dimensional schema to store a number of pre-compiled projections that can be accessed very fast and can perform very complex analysis on the data. The main disadvantage of Multi-Dimensional OLAP is that updates take the warehouse down for a long period, sometimes longer than the desired up time (sometimes longer than 24 hours!). Moreover, for sparse cubes (which is commonly the case) most of the cells in the multi-dimensional schema contain no data, and thus a significant amount of storage is wasted.

The Relational OLAP uses the Relational DBMS as the basis for OLAP and generates the data projections on the fly. Depending upon the size of the data warehouse, projection queries may take several hours or even days.

The Desktop OLAP uses tools for creating small "cubes" (projections) that reside on, and are displayed on, the desktop of personal computer (PC). This form of OLAP is targeted for specialized, small vertical projections of the data, which are created and updated as in Multi-Dimensional OLAP, but because of their tiny size, they can be updated efficiently.

The Integrated OLAP is a marketing scheme and is the combination of one or more of the above.

All forms of OLAP have the following three attributes in common: they offer decision support solutions; they permit the multi-dimensional viewing of data; and they allow a user to rapidly identify data ("drilling"), or to isolate subsets of data ("slicing" and "dicing"). The fundamental difference between OLAP forms concerns compromise trade-offs in space and precalculation (MOLAP & DOLAP) for speed of retrieval. This is even further applied in ROLAP systems, which add "summary tables" and special purpose indexes to increase performance. In other words, these approaches trade space and pre-calculated views and indexes for speed at the expense of update (down) time.

The data cube operator (J. Gray, A. Bosworth, A. Layman, and H. Pirahesh. Data Cube: A Relational Aggregation Operator Generalizing Group-By, Cross-Tab, and Sub-Totals. In *Proc. of the 12th ICDE*, pages 152–159, New Orleans, February 1996. IEEE) provided a formal framework for specifying the computation of one or more aggregate functions for all possible combinations of grouping attributes. The inherent difficulty with the cube operator is its size for both computation and storage. The number of all possible "group-bys" (subsets of data made in accordance with user provided instructions) increases exponentially with the number of the cube's dimensions ($2^d$) and a naive store of the cube behaves in a similar way.

The problem of size is exacerbated by the fact that new applications include an increasing number of dimensions. Moreover, in many new applications, dimensions naturally form hierarchies, with the user being interested in querying the underlying data in any level of the hierarchy. In this case, the number of group-bys that need to be computed increases even more, and reaches $2^H$ (where H is the total number of hierarchy levels) for the case of full data cubes. However, in such cases it is more often the case that only $$\prod_{i=1}^{d} (1 + \text{levels}(dim_i))$$

group-bys (where levels($dim_i$) is the number of hierarchy levels that the i-th dimension contains) are computed, and more specifically those group-bys that contain at most one hierarchy level from each dimension. In this case, the produced cube is called the "concatenated rollup cube". Thus, new applications cause an explosive increase in the size of the cube, and present a major problem. All methods proposed in the literature try to deal with the space problem, either by pre-computing a subset of the possible group-bys (E. Baralis, S. Paraboschi, and E. Teniente. Materialized View Selection in a Multidimensional Database. In *Proc. of VLDB Conf.*, pages 156–165, Athens, Greece, August 1997; H. Gupta. Selections of Views to Materialize in a Data Warehouse. In *Proc. of ICDT Conf.*, pages 98–112, Delphi, January 1997; H. Gupta, V. Harinarayan, A. Rajaraman, and J. Ullman. Index Selection for OLAP. In *Proc. of ICDE Conf.*, pages 208–219, Burmingham, UK, April 1997; A. Shukla, P. M. Deshpande, and J. F. Naughton. Materialized View Selection for Multidimensional Datasets. In *Proc. of the 24th VLDB Conf.*, pages 488–499, New York City, N.Y., August 1998), by estimating the values of the group-bys using approximation techniques (J. Shanmugasundaram, U. Fayyad, and P. S. Bradley. Compressed Data Cubes for OLAP Aggregate Query Approximation on Continuous Dimensions. In *Proc. of the Intl. Conf. on Knowledge Discovery and Data Mining (KDD99)*, 1999; J. S Vitter, M. Wang, and B. Iyer. Data Cube Approximation and Histograms via Wavelets. In *Proc. of the 7th Intl. Conf. Information and Knowledge Management (CIKM'98)*, 1998), or by pre-computing only those group-bys that have a minimum support (membership) of at least N tuples (K. Beyer and R. Ramakrishnan. Bottom-Up Computation of Sparse and Iceberg CUBEs. In *Proc. of the ACM SIGMOD Conf.*, pages 359–370, Philadelphia, Pa., USA, 1999). The larger the value for N, the smaller the number of group-bys that satisfy the minimum support condition and, therefore, the smaller the size of the resulting sub-cubes.

SUMMARY OF THE INVENTION

An object of the invention is to provide a highly compressed structure, herein called Dwarf, for computing, storing, and querying both full data cubes, and concatenated rollup data cubes.

In detail, the invention provides a method for structuring data for storage in either computer main memory or disk memory, which comprises analysing a datacube of the data to identify suffix redundancies in the data, and exploiting any identified suffix redundancies to reduce the size of a datacube needed to store the data. The invention particularly concerns the embodiment of such method wherein the method comprises additionally analysing a datacube of the data to identify prefix redundancies in the data, and exploiting any identified prefix redundancies in an interleaved fashion to reduce the size of the datacube needed to store the data.

The invention further provides a method for structuring data for storage in a computer or in a computer-readable storage medium, which comprises the steps of:
  (A) sampling the data to estimate the cardinalities and or correlation between dimensions and ordering the dimensions accordingly;
  (B) sorting the data according to the dimension ordering acquired by step (A);
  (C) assigning one level of a Dwarf structure, moving top-down:
    (1) for a full data cube, to each hierarchy level of the dimensions, according to the dimension ordering, and the hierarchy-level ordering within each dimension; and
    (2) for a concatenated rollup cube, to each dimension, according to the dimension ordering; wherein each level consists of multiple rollup representations whose number is equal to the number of hierarchy levels of the dimension; wherein exactly one rollup representation is assigned to each hierarchy level of the dimension; wherein the rollup representations are ordered from the one corresponding to the most detailed hierarchy level to the one corresponding to the least detailed hierarchy level; and
  (D) inserting data in nodes one tuple at a time.

The invention particularly concerns the embodiment of such methods wherein in the step (C)(1), for each dimension representing a hierarchy, data is ordered with primary key being the value of the most general level, and proceeding to most specific levels for the case of the full data cube; wherein each dimension is expanded in the fact table into as many data values, as the number of its hierarchy levels.

The invention particularly concerns the embodiment of such methods wherein step (D) comprises the sub-steps of:
  (1) creating nodes and cells in a path from the Dwarf structure's root to a leaf node;
  (2) storing the tuple's aggregates in a cell of a leaf node, wherein if the cell already existed, the new values are aggregated with the already stored ones;
  (3) for nodes that will receive no more input data, calculating their aggregates values.

The invention particularly concerns the embodiments of such methods wherein in step (C)(1), for each dimension representing a hierarchy, data is ordered with primary key being the value of the most general level, and proceeding to most specific levels, and/or wherein in step (D)(3), the calculation of aggregate values is accomplished by merging previously calculated aggregate values, or by first sorting the corresponding tuples and then processing them accordingly, wherein aggregate values that correspond to different aggregates (group-bys), but which contain identical aggregate values, are identified and their storage is coalesced.

The invention particularly concerns the embodiment of such methods wherein root-to-leaf paths in the Dwarf structure represent keys for identifying data records. The invention further concerns the embodiment of such methods wherein each key represents either a value of a hierarchy level of a dimension, or all the values of the dimension's hierarchy level. The invention further concerns the embodiment of such methods wherein the data identified by keys represented by a root-to-leaf path in Dwarf structure is the aggregates of all the data records that match the attribute values of the path. The invention further concerns the embodiment of such methods wherein group-bys that aggregate values along at least one hierarchy level of any dimension are produced by merging previously calculated aggregate values. The invention further concerns the embodiment of such methods wherein different sets of group-bys that are calculated from the same input data are identified, the identified sets of different group-bys being suffix redundancies.

The invention particularly concerns the embodiment of such methods wherein the calculation uses the SuffixCoalesce algorithm, the SuffixCoalesceWithSort algorithm, the HybridSuffixCoalesce algorithm, or the SuffixHierarchies algorithm.

The invention particularly concerns the embodiment of such methods wherein the storage of different group-bys that are calculated from the same input data is coalesced, and their suffix redundancy is therefore eliminated.

The invention additionally concerns a data storage device comprising a Dwarf data structure, the structure comprising:
  (A) A full data cube, wherein the structure of the full data cube contains as many levels as the sum of all the hierarchy levels of all the dimensions of the stored data; wherein:
    (1) exactly one level of the structure is assigned to each hierarchy level of the dimensions;
    (2) nodes at each level contain cells; wherein each cell of a non-leaf node consists of a key value and a pointer to a node of the next lower level; and wherein each cell of a leaf-node comprises a key value and the desired aggregate values; and wherein each node also contains a special ALL cell, the ALL cell corresponding to all the keys of the node; wherein ALL cells of non-leaf nodes contain pointers to the next lower level, and ALL cells of leaf nodes contain aggregate values;
  or
  (B) a concatenated rollup datacube, wherein the structure of the concatenated rollup datacube contains as many levels as the number of the dimensions of the stored data; and wherein:
    (1) exactly one level of the structure is assigned to each dimension;
    (2) each level consists of multiple "rollup representations", whose number is equal to the number of hierarchy levels of the dimension; wherein exactly one rollup representation is assigned to each hierarchy level of the dimension; wherein the rollup representations are ordered from the one corresponding to the most detailed hierarchy level to the one corresponding to the least detailed hierarchy level;
    (3) nodes at each level contain cells; wherein each cell of a non-leaf node consists of a key value and a pointer to a node of the next lower level; and wherein each cell of a leaf-node comprises a key value and the desired aggregate values; and wherein each node also contains a special ALL cell, the ALL cell corresponding to all the keys of the node; wherein ALL cells of nodes in the last rollup representation contain aggregate values of the stored data when they belong to the last level, or a pointer to a node at the next level otherwise; and wherein ALL cells of nodes not in the last rollup representation contain pointers to a node in the next rollup representation of the current level.

The invention particularly concerns the embodiment of a data storage device wherein the data structure is constructed by inserting one tuple at a time, according to the sub-steps of:

(A) creating nodes and cells in a path from the Dwarf structure's root to a leaf node;

(B) storing the tuple's aggregates in a cell of a leaf node, wherein if the cell already existed, the new values are aggregated with the already stored ones; and (C) For nodes that will receive no more input data, calculating their aggregates values.

The invention particularly concerns the embodiment of such data storage devices wherein in step (C), the calculation of aggregate values is accomplished by merging previously calculated aggregate values, or by first sorting the corresponding tuples and then processing them accordingly, wherein aggregate values that correspond to different aggregates (group-bys), but which contain identical aggregate values, are identified and their storage is coalesced.

The invention further concerns the embodiments of such data storage devices wherein the device additionally samples input data to estimate the cardinality of each dimension and orders the dimensions according to decreasing cardinalities.

The invention further concerns the embodiments of such data storage devices wherein the device additionally calculates group-bys that aggregate values across at least one hierarchy level by merging previously calculated aggregate values. The invention further concerns the embodiments of such data storage devices wherein the device additionally organizes key values of cells within a node in a sorted list, which becomes a B+-tree if the number of keys exceeds a user-specified threshold. The invention further concerns the embodiments of such data storage devices wherein the device additionally coalesces the store of organized different sets of group-bys and eliminates their suffix redundancy. The invention further concerns the embodiments of such data storage devices wherein the device additionally identifies different sets of group-bys that can be calculated from the same input data and which contain the same aggregate values.

The invention further concerns a data storage device comprising:

(A) a Dwarf data structure;

(B) means for sampling the input data to estimate the cardinality of each dimension and ordering the dimensions according to decreasing cardinalities;

(C) means for calculating group-bys that aggregate values across at least one hierarchy level by merging previously calculated aggregate values;

(D) means for organizing key values of cells within a node in a sorted list, which becomes a B+-tree if the number of keys exceeds a user specified threshold;

(E) means for identifying different sets of group-bys that can be calculated from the same input data and which, therefore, contain the same aggregate values;

(F) Means for coalescing the store of different sets of group-bys that are identified in (E), thus eliminating their suffix redundancy.

The invention further concerns the embodiment of such a data storage devices wherein the Dwarf data structure is a full datacube that contains as many levels as the sum of all the hierarchy levels of all the dimensions of the stored data, wherein:

(1) exactly one level of the structure is assigned to each hierarchy level of the dimensions;

(2) nodes at each level contain cells; wherein each cell of a non-leaf node consists of a key value and a pointer to a node of the next lower level; and wherein each cell of a leaf-node comprises a key value and the desired aggregate values; and (3) each node also contains a special ALL cell, the ALL cell corresponding to all the keys of the node; wherein ALL cells of non-leaf nodes contain pointers to the next lower level, and ALL cells of leaf nodes contain aggregate values.

The invention further concerns the embodiments of such data storage devices wherein the Dwarf data structure is a concatenated rollup datacube that contains as many levels as the number of the dimensions of the stored data; wherein:

(1) exactly one level of the structure is assigned to each dimension;

(2) each level consists of multiple rollup representations, whose number is equal to the number of hierarchy levels of the dimension; wherein exactly one rollup representation is assigned to each hierarchy level of the dimension; wherein the rollup representations are ordered from the one corresponding to the most detailed hierarchy level to the one corresponding to the least detailed hierarchy level; and (3) nodes at each level contain cells; wherein each cell of a non-leaf node consists of a key value and a pointer to a node of the next lower level; and wherein each cell of a leaf-node comprises a key value and the desired aggregate values; and wherein each node also contains a special ALL cell, the ALL cell corresponding to all the keys of the node; wherein ALL cells of nodes in the last rollup representation contain aggregate values of the stored data when they belong to the last level, or a pointer to a node at the next level otherwise; and wherein ALL cells of nodes not in the last rollup representation contain pointers to a node in the next rollup representation of the current level.

The invention further concerns the embodiments of such data storage devices wherein the Dwarf data structure is constructed by inserting one tuple at a time.

The invention further concerns the embodiments of such data storage devices wherein the tuple being inserted is inserted according to the sub-steps of:

(A) creating nodes and cells in a path from the Dwarf structure's root to a leaf node;

(B) storing the tuple's aggregates in a cell of a leaf node, wherein if the cell already existed, the new values are aggregated with the already stored ones; and (C) For nodes that will receive no more input data, calculating their aggregates values.

The invention further concerns the embodiments of such data storage devices wherein in step (C), the calculation of aggregate values is accomplished by merging previously calculated aggregate values, or by first sorting the corresponding tuples and then processing them accordingly, wherein aggregate values that correspond to different aggregates (group-bys), but which contain identical aggregate values, are identified and their storage is coalesced.

The invention further concerns the embodiments of such data storage devices wherein estimates of the dimensions' cardinalities are acquired by sampling the input data; wherein a dimension ordering is created based on the acquired estimates; wherein the input data are sorted according to an acquired dimension ordering, wherein the input data is inserted in the Dwarf structure; wherein aggregate values are calculating by merging previously calculated values, whenever possible; and/or wherein suffix redundancies are identified and their storage is coalesced.

The invention further concerns the embodiments of such data storage devices wherein the calculation of a sub-dwarf of the ALL cell of a node N is accomplished through the use of either the SuffixCoalesce, SuffixCoalesceWithSort, HybridSuffixCoalesce or HierarchiesCoalesce algorithm by estimating whether the sub-dwarfs to be merged are currently stored in the system's buffers; and/or wherein for each non-leaf node N at level i of a D-level Dwarf, the aggregate value V obtained by following from node N ALL cells until V is reached can be copied to the ALL cell of node N.

The invention further concerns the embodiments of such data storage devices wherein the Dwarf structure is queried, and the aggregate values for any specified group-by are retrieved; wherein the Dwarf structure is bulk-updated by using a merge-pack algorithm; wherein the Dwarf structure is updated by using an incremental update algorithm; and/or wherein the Dwarf structure is updated by using a Dwarf reconstruction algorithm.

The invention additionally concerns a method for retrieving the aggregate values that correspond to any specified group-by of stored data, which comprises querying a data storage device comprising the data, the data storage device comprising:

(A) a Dwarf data structure;
(B) means for sampling the input data to estimate the cardinality of each dimension and ordering the dimensions according to decreasing cardinalities;
(C) means for calculating group-bys that aggregate values across at least one hierarchy level by merging previously calculated aggregate values;
(D) means for organizing key values of cells within a node in a sorted list, which becomes a B+-tree if the number of keys exceeds a user specified threshold;
(E) means for identifying different sets of group-bys that can be calculated from the same input data and which, therefore, contain the same aggregate values;
(F) means for coalescing the store of different sets of group-bys that are identified in (E), thus eliminating their suffix redundancy.

The invention additionally concerns a method for updating a Dwarf datacube structure comprised of the steps:

(A) creating a Delta-Dwarf for the update data, by:
(1) sampling input data to estimate the cardinality of each dimension and orders the dimensions according to decreasing cardinalities;
(2) calculating group-bys that aggregate values across at least one hierarchy level by merging previously calculated aggregate values;
(3) organizing key values of cells within a node in a sorted list, which becomes a B+-tree if the number of keys exceeds 2 disk pages and coalescing the store of organized different sets of group-bys thereby eliminating their suffix redundancy; and (4) identifying different sets of group-bys that can be calculated from the same input data and which contain the same aggregate values; and (B) merging the Delta-Dwarf with the old Dwarf using a merge-packing algorithm.

The invention additionally concerns a method for incrementally updating an existing Dwarf datacube structure comprised of the steps:

(1) Ordering the dimensions of the update data according to the dimension ordering of the existing Dwarf datacube;
(2) Traversing the old Dwarf structure top-down to identify nodes that need to be updated due to the existence of update tuples; wherein a node at a level L of the Dwarf structure needs to be updated if and only if at least one update tuple contains a prefix of length L-1 that is identical to the path followed from the root of the structure to the current node, and wherein each node also contains a special ALL cell, the ALL cell corresponding to all the keys of the node;
(3) Updating any node N at the lowest level of the structure by:
(a) Identifying whether the update tuples that influence the aggregate values stored in N will require the insertion of new key values in N;
(b) Creating a new node to store the results if the process in step (a) shows that new keys need to be inserted to N, otherwise storing the results in N.
(c) For each key in the resulting node, merging the aggregate values existing in N with those of the update tuples.
(d) Calculating the aggregate values for the ALL cell.
(5) Updating any node N at higher levels by a method comprised of:
(a) Recursively propagating the update procedure to the nodes pointed by the cells of N.
(b) Merging the resulting updated dwarfs to calculate the ALL cell of the node.

The invention additionally concerns a method for updating an existing Dwarf datacube structure into a new Dwarf datacube structure using a reconstruct algorithm comprised of the steps:

(A) Extracting the tuples of the old Dwarf by performing a query on the most detailed hierarchy level of each dimension, requesting all possible values;
(B) Ordering the data in the update tuples according to the dimension ordering in the existing Dwarf;
(C) Merging the tuples acquired from steps (A) and (B);
(D) Employing the merged tuples to construct a new Dwarf datacube.

DESCRIPTION OF THE PREFERRED EMBODIMENTS

Figures 1, 2:
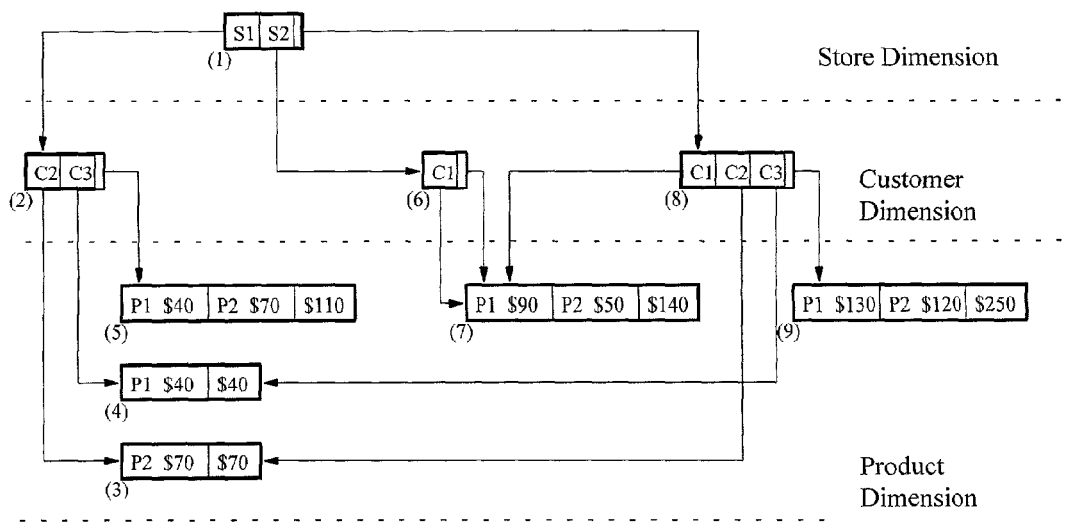
FIG. 1 is a diagram of the Dwarf Cube for Table 1.
FIG. 2 illustrates two possible group-bys for Table 1.

The invention relates to a highly compressed structure for computing, storing, and querying full data cubes. This present invention defines the storage organization of the present invention as a "Dwarf" storage organization (or "Dwarf"). The term "Dwarf" is used in analogy to dwarf stars that have a very large condensed mass but occupy very small space. Such stars are so dense that their mass is about one ton/cubic centimeter. The "Dwarf" storage organization of the present invention is a highly compressed structure for computing, storing, and querying both full data cubes and concatenated rollup cubes. The term "full cubes," as used herein, is intended to refer to all $2^H$ (where H is the total number of hierarchy levels) group-bys of the Cube operator at 100% precision, unlike the cube sub-setting and the approximating cube methods. Moreover, the term "concatenated rollup cubes", as used herein, is intended to refer to those $$\prod_{i=1}^{d}(1+\text{levels}(dim_i))$$

group-bys of the Cube operator, where each group-by contains for each dimension at most one of its hierarchy levels. The Dwarf Storage Organization of the present invention solves the storage space problem, by identifying prefix and suffix redundancies in the structure of the cube and factoring them out from their store. Even though prefix redundancies in the cube structure have been identified by other methods as well (T. Johnson, D. Shasha. Hierarchically Split Cube Forests for Decision Support: description and tuned design, 1996 Working paper), no previous method has identified, and much less reduced or eliminated, suffix redundancies.

Prefix redundancy can be easily understood by considering a sample cube with dimensions a, b and c. Each value of dimension a, appears in 4 group-bys (a, ab, ac, and abc), and possibly many times in each group-by. By way of illustration, Table 1 shows an exemplary tiny fact table with three dimensions (Store, Customer, Product), and one measure attribute (Price). For this fact table, the value S1 will appear a total of 7 times in the corresponding cube, and more specifically in the group-bys: <S1,C2,P2>, <S1,C3,P1>, <S1,C2>, <S1,C3>, <S1,P2>, <S1,P1> and <S1>. The same also happens with prefixes of size greater than one-note that each pair of a, b values will appear not only in the ab group-by, but also in the abc group-by. The Dwarf storage organization of the present invention recognizes this kind of redundancy, and stores every unique prefix just once, therefore providing substantial space savings.

TABLE 1

Fact Table for Cube Sales

| Store | Customer | Product | Price |
|-------|----------|---------|-------|
| S1 | C2 | P2 | $70 |
| S1 | C3 | P1 | $40 |
| S2 | C1 | P1 | $90 |
| S2 | C1 | P2 | $50 |

In accordance with the Dwarf storage organization of the present invention, suffix redundancy occurs when two or more group-bys share a common suffix (like abc and bc). For example, consider a value $b_j$ of dimension b that appears in the fact table tuples with a single value $a_i$ of dimension A. As used herein, the term "tuple" is intended to refer to an ordered set of values of related elements (pairs, triples, quadruples, etc.). Such an example appears in Table 1, where the value C1 appears with only the value S2). Then, the group-bys <$a_i,b_j,x$> and <$b_j,x$> will always have the same value, for any value x of dimension c. This happens because the second group-by aggregates all the tuples of the fact table that contain the combinations of any value of the a dimension (which here is just the value $a_i$) with $b_j$ and x. Since x is in general a set of values, this suffix redundancy has a multiplicative effect. Suffix redundancies are more apparent in correlated dimension values. Such correlations are often in real datasets, like the Weather dataset used in one of our experiments. Suffix redundancy is identified during the construction of the Dwarf cube of the present invention and is preferably eliminated by coalescing their space.

The prefix redundancy is high for dense areas of the cubes while suffix redundancy is even higher for the sparse areas. When both such redundancies are addressed, the exponential sizes of high dimensional full cubes are fused into a dramatically condensed store. The Dwarf storage organization of the present invention is practical because prefix and suffix redundancies can be automatically discovered without requiring knowledge of the value distributions and without the need to use sophisticated sampling techniques to calculate them.

The storage savings obtained through the use of the present invention are spectacular for both dense and sparse cubes. As discussed below, in most cases of very dense cubes, the size of the Dwarf cube is much less than the size of the fact table. Whereas for dense cubes the savings are almost entirely from prefix redundancies, as the cubes get sparser, the savings from the suffix redundancy elimination increases, and quickly becomes the dominant factor of the total savings. Equally, or even more, significant is the reduction of the computation cost. Each redundant suffix is identified prior to its computation. Furthermore, because of the condensed size of the Dwarf cube, the time needed to query and update is also reduced. Inherently, the Dwarf structure provides an index mechanism and needs no additional indexing for querying it. It is also self-sufficient in the sense that it does not need to access or reference the fact table in answering any of the views stored in it.

An additional optimization implemented by the invention is to avoid precomputation of certain group-bys that can be calculated on-the-fly by using fewer than a given constant amount of tuples. The information needed to calculate these group-bys is stored inside the Dwarf structure in a very compact and clustered way. By modifying the value of the above constant, the user is able to trade query performance for storage space and creation time. This optimization was motivated from iceberg cubes (K. Beyer and R. Ramakrishnan, "Bottom-Up Computation of Sparse and Iceberg CUBEs," In *Proc. of the ACM SIGMOD Conf.*, pages 359–370, Philadelphia, Pa., USA, 1999) and may be enabled by the user if a very limited amount of disk space and/or limited time for computing the Dwarf is available. This further increases the versatility of the Dwarf cubes.

To demonstrate the storage savings provided by the Dwarf storage organization of the present invention (and what fraction of the savings can be attributed to prefix and suffix redundancies) the Dwarf cube sizes were first compared against a binary storage footprint (BSF), i.e. as though all the group-bys of a cube were stored in unindexed binary summary tables. Although this is not an efficient (or sometimes feasible) store for a cube or sub-cubes, it provides a well understood point of reference and it is useful when comparing different stores.

The Dwarf cubes of the present invention were also compared with Cubetrees which were shown in N. Roussopoulos, Y. Kotidis, and M. Roussopoulos, "Cubetree: Organization of and Bulk Incremental Updates on the Data Cube. In Proceedings of the ACM SIGMOD International Conference on Management of Data, pages 89–99, Tucson, Ariz., May 1997 and Y. Kotidis and N. Roussopoulos. "An Alternative Storage Organization for ROLAP Aggregate Views Based on Cubetrees." In Proceedings of the ACM SIGMOD International Conference on Management of Data, pages 249–258, Seattle, Wash., June 1998, to exhibit at least a 10:1 better query response time, a 100:1 better update performance and 1:2 the storage of indexed relations. The Dwarfs are found to consistently outperform the Cubetrees on all counts: storage space, creation time, query response time, and updates of full cubes. Dwarf cubes achieve comparable update performance on partial cubes stored on Cubetrees having the same size with Dwarf cubes. However, byte per byte, Dwarfs store many more materialized views than the corresponding Cubetree structures and, therefore, can answer a much wider class of queries for the same footprint.

Several datasets were used to compute Dwarf cubes. One of them was a cube of 20 dimensions, each having a cardinality of 1000, and a fact table containing 100,000 tuples. The BSF for its cube is 4.4 TB (the BSF sizes, and the size of Dwarf cubes without enabling suffix coalescing were accurately measured by first constructing the Dwarf cube, and then traversing it appropriately). Eliminating the prefix redundancy resulted in a Dwarf cube of 1.4 TB (31.8% of the original size). Eliminating the suffix redundancy reduced the size of the Dwarf cube to just 300 MB (all the sizes of Dwarf cubes, unless stated otherwise, correspond to the full Dwarf cubes), a 1:14666 reduction over BSF.

A Petacube, that is a cube of 25-dimensions which has BSF equal to one petabyte, was also created. The Dwarf cube for the Petacube is just 2.3 GB and took 20 minutes to create. This is a 1:400,000 storage reduction ratio. Such a colossal reduction in space and computation time highlights the advantage provided by the Dwarf storage organization of the present invention compared with existing techniques (in which a good subset of the cube must be selected for store or lossy techniques that give only some answers or approximate answers must be used). One can simply store the entire Dwarf cube. Moreover, this can be done faster, and without loss in the number of group-bys or the precision of their data.

The Dwarf storage organization of the present invention magnifies all the advantages of MOLAP and ROLAP, but avoids all of the disadvantages of these methods. Its parameters again trade space for speed in a systematic and methodical way, but because of the "minimization" and "density" of the storage the cost has dramatically changed. The main advantage of the Dwarf storage organization is that both indexing and ROLAP summary tables are merged into a single storage organization, which reduces the total space to a tiny fraction of that of either MOLAP or ROLAP. This is preferably achieved by identifying and factoring out redundant parts of data cubes before they are generated, thus reducing both storage and computation time. Second, creation and maintenance of this storage has been reduced to sorting and incremental bulk merging for optimal performance. This achieves creation speeds that are extremely fast and updates with minimum down time window.

For ease of presentation, the Dwarf storage organization of the present invention for the case of full cubes, when the dimensions do not represent hierarchies (or equivalently represent hierarchies of just one level) is described below. The necessary modifications to the Dwarf structure properties for the case of full cubes when the dimensions represent hierarchies of more than one level, are then described, and finally the corresponding extensions of the Dwarf structure for the case of the concatenated rollup cube are presented.

I. The Dwarf Structure

The Dwarf storage organization of the present invention is illustrated below with respect to a simple embodiment. As will be appreciated, however, the present invention is not intended to be limited to this embodiment of the invention, which is provided solely to illustrate the invention.

A. Dwarf Storage Organization of the Present Invention

Table 1, shown above, shows a tiny fact table with three dimensions (Store, Customer, Product), and one measure attribute (Price). FIG. 1 shows the Dwarf Cube for this dataset. It is a full cube using the aggregate function SUM. The nodes are numbered according to the order of their creation.

The height of the Dwarf is equal to the number of dimensions, each of which is mapped onto one of the levels shown in FIG. 1. The root node contains cells of the form [key, pointer], one for each distinct value of the first dimension. The pointer of each cell points to the node below containing all the distinct values of the next dimension that are associated with the cell's key. The node pointed by a cell and all the cells inside it are dominated by the cell. For example, the cell S1 of the root dominates the node containing the keys C2, C3. Each non-leaf node has a special ALL cell, shown as a small gray area to the right of the node, holding a pointer and corresponding to all the values of the node.

A path from the root to a leaf such as <S1,C3,P1> corresponds to an instance of the group-by Store, Customer, Product and leads to a cell [P1, $40] which stores the aggregate of that instance. Some of the path cells can be open using the ALL cell. For example, <S2,ALL,P2> leads to the cell [P2, $50], and corresponds to the sum of the Prices paid by any Customer for Product P2 at Store S2. At the leaf level, each cell is of the form [key, aggregate] and holds the aggregate of all tuples that match a path from the root to it. Each leaf node also has an ALL cell that stores the aggregates for all the cells in the entire node. <ALL,ALL,ALL> leads to the total Prices (group-by NONE). Those of ordinary skill will appreciate that the three paths <S2,C1,P2>, <S2,ALL,P2>, and <ALL,C1,P2>, whose values are extracted from processing just the last tuple of the fact-table, all lead to the same cell [P2, $50], which, if stored in different nodes, would introduce suffix redundancies. By coalescing these nodes, such redundancies are avoided. In FIG. 1, all nodes pointed by more than one pointer are coalesced nodes.

B. Properties of Dwarf

In Dwarf, as in previous algorithms proposed for cube computation, the dimension attributes are required to be of integer type (thus mapping other types, like strings, to integers). However, unlike other methods, there is no requirement for packing the domain of values between zero and the cardinality of the dimension. Any group-by of a D-dimensional cube can be expressed by a sequence of D values (one for each dimension), to which the present invention will refer as the coordinates of the group-by in a multidimensional space. In SQL queries, the coordinates are typically specified in the WHERE clause. The group-by's $j^{th}$ coordinate can either be a value of the cube's $j^{th}$ dimension, or left open to correspond to the ALL pseudo-value. For example, queries in FIG. 2 correspond to the group-bys <ALL, C1, X> and <S2, C1, X>, for the cube of Table 1.

The Dwarf data structure has the following properties:
1. It is a directed acyclic graph (DAG) with just one root node and has exactly D levels, where D is the number of cube's dimensions.
2. Nodes at the $D^{th}$ level (leaf nodes) contain cells of the form: [key, aggregateValues]
3. Nodes in levels other that the $D^{th}$ level (non-leaf nodes) contain cells of the form: [key, pointer]. A cell C in a non-leaf node of level i points to a node at level i+1, which it dominates. The dominated node then has the node of C as its parent node.
4. Each node also contains a special cell, which corresponds to the cell with the pseudo-value ALL as its key. This cell contains either a pointer for a non-leaf node or the aggregateValues for a leaf node.
5. Cells belonging to nodes at level i of the structure contain keys that are values of the cube's $i^{th}$ dimension. No two cells within the same node contain the same key value.
6. Each cell $C_i$ at the $i^{th}$ level of the structure, corresponds to the sequence $S_i$ of i keys found in a path from the root to the cell's key. This sequence corresponds to a group-by with D-i dimensions unspecified. All group-bys having sequence $S_i$ as their prefix, will correspond to cells that are descendants of $C_i$ in the Dwarf structure. For all these group-bys, their common prefix will be stored exactly once in the structure.
7. When two or more nodes (either leaf or non-leaf) contribute the same nodes and cells to the structure, their storage is coalesced, and only one copy of them is stored. In such a case, the coalesced node will be reachable through more than one paths from the root, all of which will share a common suffix. For example, in the node at the bottom of the Product level of FIG. 1, the first cell of the node corresponds to the sequences <S1,C2,P2> and <ALL,C2,P2>, which share the common suffix <C2,P2>. If a node N is a coalesced node, then any node X which is a descendant of N will also be a coalesced node, since X can be reached through multiple paths passing through N.

A traversal in the Dwarf structure always follows a path of length D, starting from the root to a leaf node. It has the form:

<[Node$_1$.val|ALL],[Node$_2$.val|ALL], . . . ,[Node$_D$.val|ALL]> meaning that the $i^{th}$ key found in the path will either be a value Node$_i$.val of the $i^{th}$ dimension, or the pseudo-value ALL. In level i of the structure, depending on the $i^{th}$ coordinate V of the group-by, one locates the cell in the current node that has the value V as its key, and descends to the next level. The Dwarf structure thus provides an efficient interlevel indexing method without additional structure.

The following terms will aid in the description of the algorithms:

The "dwarf of a node N" is defined to be the node itself and all the dwarfs of the nodes dominated by the cells of N. The "dwarf of a node X" that is dominated by some cell of N is called a "sub-dwarf of N." Since cells in leaf nodes dominate no other nodes, the dwarf of a leaf node is the node itself.

The "number of cells in the node" $N_j$, which a cell $C_j$ dominates, is called the "branching factor" of $C_j$.

A sequence of i keys, followed in any path from the root to a node N at level i+1 of the Dwarf structure, is called the "leading prefix of N." A leading prefix of N, which contains no coordinate with ALL, is called the "primary leading prefix of N."

The "content of a cell" $C_j$, belonging to a node N, is either the aggregateValues of $C_j$ if N is a leaf node, or the sub-dwarf of $C_j$, if N is a non-leaf node.

C. Evidence of Structural Redundancy
1. Evidence of Structural Redundancy

A path from the root of the Dwarf structure to a leaf, corresponds to an instance of some group-by. Dwarf creates the minimum number of cells to accommodate all paths. In the cube presented in FIG. 1, for the first level of the structure (Store), the maximum number of cells required is equal to the cardinality of the Store dimension Card$_{store}$ plus 1 (for the ALL cell).

For the second level (Customer), if the cube was completely dense, one would need a number of cells equal to the product:

(Card$_{store}$+1)(Card$_{customer}$+1)

Since most cubes are sparse, there is no need to create so many cells.

However, even in the case of dense cubes, the storage required to hold all cells of the structure (including the ALL cells) is comparable to that required to hold the fact table. A Dwarf for a saturated cube of D dimensions and the same cardinality N for each dimension, is actually a tree with a constant branching factor equal to: bf=N+1. Therefore, the number of leaf nodes and non-leaf nodes required to represent this tree is:

$$nonLeafNodes = \frac{(N+1)^{D-1} - 1}{N}, \quad LeafNodes = (N+1)^{D-1}$$

Each non-leaf node contains N non-leaf cells and one pointer and each leaf node contains N leaf cells and the aggregates. The size of a non-leaf cell is two units (one for the key and one for the pointer), while the size of a leaf-cell is A+1 (A units for the aggregates and one for the key). The fact table of the saturated cube has $N^D$ tuples. The size for each tuple is D+A. The ratio of the size of the Dwarf over the fact table is then approximated by:

$$ratio \approx \frac{A(N+1)^D + N(N+1)^{D-1}}{(D+A)N^D}$$

(The size of all the leaf nodes is much larger than the size of all the non-leaf nodes).

For example, a full dense cube with D=10 dimension, a cardinality of N=1,000 for each dimension, and one aggregate (A=1), has a ratio of: 0.18, i.e. the Dwarf representation needs less than 20% of the storage that the fact table requires. This proves that the fact table itself (and, therefore, certainly the cube) contains redundancy in its structure.

The above discussion serves to demonstrate that Dwarf provides space savings even in the case of very sparse cubes. Of course, for such a case a MOLAP representation of the cube would provide a larger cube compression. However, MOLAP methods for storing the cube require knowledge (or the discovery) of the dense areas of the cube, and do not perform well for sparse, high-dimensional cubes. On the other hand, Dwarf provides an automatic method for highly compressing the cube independently of the characteristics (distribution, density, dimensionality, . . . ) of the data.

2. Suffix Redundancy

Since Dwarf does not store cells that correspond to empty regions of the cube, each node contains at least one cell with a key value, plus the pointer of the ALL cell. Therefore, the minimum branching factor is 2, while the maximum value of the branching factor of a cell at level j is 1+$Card_{j+1}$, where $Card_{j+1}$ is the cardinality of dimension j+1. The branching factor decreases as one descends to lower levels of the structure. An approximation of the branching factor at level j of the structure, assuming uniform distribution for the values of each dimension for the tuples in the fact table, is:

$$\text{branch}(j) = 1 + \min\left(Card_{j+1}, \max\left(1, T \Big/ \prod_{i=1}^{j} Card_i\right)\right)$$

where T is the number of tuples in the fact table. If the cube is not very dense, the branching will become equal to 2 at the $k^{th}$ level, where k is the lowest number such that $$T \Big/ \prod_{i=1}^{j} Card_i \leq 1.$$

For example, for a sparse cube with the same cardinality N=1000 for all dimensions, D=10 dimensions and T=10,000,000 ($\ll N^D$) tuples, the branching factor will reach the value 2 at level k=$\lceil \log_N T \rceil$=3. This means that in very sparse cubes, the branching factor deteriorates to 2 close to the root levels. A branching factor of 2 guarantees (as shown below) that suffix redundancy exists at this level (but not just in this case). Therefore, the smaller the value of k, the larger the benefits obtained from eliminating suffix redundancy, since the storage of larger dwarfs is avoided.

Correlated areas of the fact table can also be coalesced. Assume for example, that a set of certain customers $C_S$ shop only at a specific store S. The views <Store,Customer, . . . > and <ALL,Customer, . . . > share the suffix that corresponds to the set $C_S$. In Table 1, customers $C_2$ and $C_3$ shop only at store $S_1$ and in FIG. 1, the nodes 3 and 4 of the dwarf of node 2 are also coalesced from node 8.

D. The Dwarf Structure in the Presence of Hierarchies in Full Cubes

Figure 3:
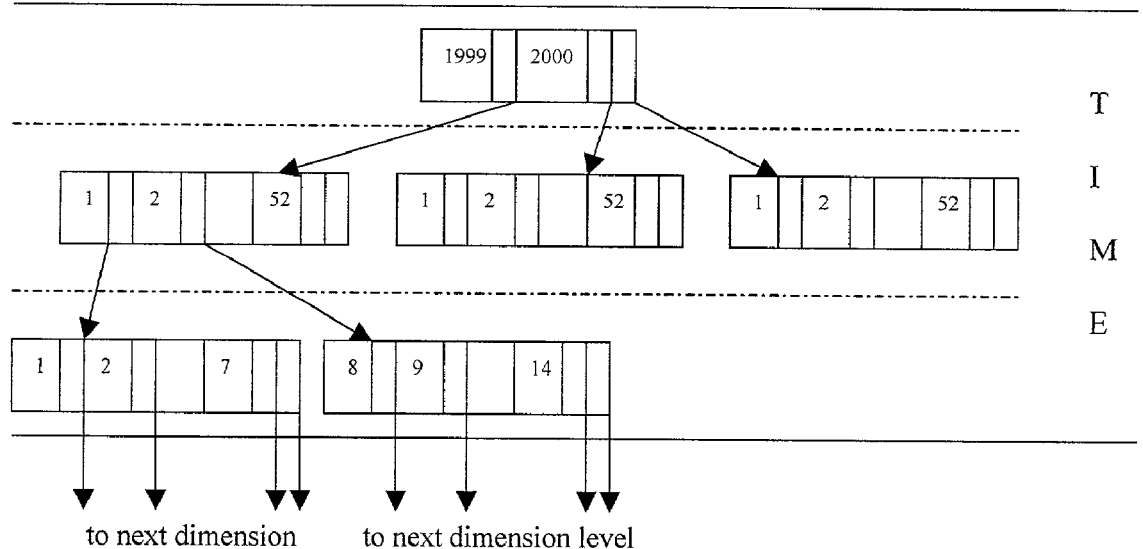
FIG. 3 illustrates how a time hierarchy can be stored in a Dwarf Cube.

Dwarf can also capture hierarchies and perform queries on hierarchical dimensions at different granularities, or different hierarchy levels. For example, for the time dimension, queries might be specified on days, years, quarters and months. Such a hierarchical dimension consists in the Dwarf structure by as many levels as the levels of the hierarchy it represents. For example, for a dimension containing data of the time hierarchy presented above, 4 levels will be assigned in the Dwarf structure. These levels will be like all the other levels described so far; the nodes will have the same format, and the cell key values will have the same meaning, with the only difference that a cell key now represents the value of a dimension for a specific level in the hierarchy it represents. Moreover, suffix coalescing will also happen for nodes of the same hierarchy level. Thus, hierarchy levels are treated in the same way in which dimensions were treated in the previous sections. Representing hierarchies of full cubes in the Dwarf structure of the present invention simply requires expanding each dimension of the fact table to contain the dimension's values for all of its hierarchy levels. The algorithms for constructing and updating the dwarf structure described below are not affected at all. An example of how a time hierarchy is stored is presented in FIG. 3. In this example, the time hierarchy of containing the year, week and days levels is considered. For presentation purposes, only a portion of the Dwarf structure for these 3 levels is presented in FIG. 3.

II. Constructing Dwarf Cubes

The Dwarf construction is preferably governed by two interleaved processes: the prefix expansion, and the suffix coalescing. A non-interleaved two-pass process would first construct a cube with the prefix redundancy eliminated, and then check in it for nodes that can be coalesced. However, such an approach would require an enormous amount of temporary space and time, due to the size of the intermediate cube. It is thus highly desired to be able to determine when a node can be coalesced with another before actually creating it. By imposing a certain order in the creation of the nodes, suffix coalescing and prefix expansion can be performed at the same time, without requiring two passes over the structure.

Before presenting the algorithm for constructing the Dwarf cube, some terms that will be frequently used in the algorithm's description are presented. A node "ans_N" (or "$N_{asn}$") is called an ancestor of N if and only if ("iff") N is a descendant node of ans_N. During the construction of the Dwarf Cube, a node N at level j of the Dwarf structure is "closed" if there exists no unprocessed tuple of the fact-table that contains a prefix equal to the primary leading prefix of N. An existing node of the Dwarf structure which is not closed is considered "open."

The construction of a Dwarf cube is preceded by a single sort on the fact table using one of the cube's dimensions as the primary key, and collating the other dimensions in a specific order. The choice of the dimensions' ordering has an effect on the total size of the Dwarf Cube. Dimensions with higher cardinalities are more beneficial if they are placed on the higher levels of the Dwarf cube. This will cause the branching factor to decrease faster, and coalescing will happen in higher levels of the structure. The ordering used will either be the one given by the user (if one has been specified), or will be automatically chosen by Dwarf after performing a scan on a sample of the fact table and collecting statistics on the cardinalities of the dimensions.

A. The Dwarf Construction ("CreateDwarfCube") Algorithm

The Dwarf construction algorithm "CreateDwarfCube" is presented in Algorithm 1. The construction requires just a single sequential scan over the sorted fact table. For the first tuple of the fact table, the corresponding nodes and cells are created on all levels of the Dwarf structure. As the scan continues, tuples with common prefixes with the last tuple will be read. One creates the necessary cells to accommodate new key values as one progresses through the fact table. At each step of the algorithm, the common prefix P of the current and the previous tuple is computed. If one considers the preferred path one follows to store the aggregates of the current tuple, then the first $|P|+1$ nodes (where $|P|$ is the size of the prefix) of the path up to a node N have already been created because of the previous tuple. Thus, $D-|P|-1$ new nodes need to be created by expanding the structure downwards from node N (and thus the name Prefix Expansion), and an equal number of nodes have now become closed. When a leaf node is closed, the ALL cell is produced by aggregating the contents (aggregate values) of the other cells in the node. When a non-leaf node is closed, the ALL cell is created and the SuffixCoalesce algorithm is called to create the sub-dwarf for this cell.

Algorithm 1 CreateDwarfCube Algorithm
  Input: sorted fact table, D: number of dimensions
  1: Create all nodes and cells for the first tuple
  2: last_tuple=first tuple of fact table
  3: while more tuples exist unprocessed do
  4:   current tuple=extract next tuple from sorted fact table
  5:   P=common prefix of current tuple, last_tuple
  6:   if new closed nodes exist then
  7:     write special cell for the leaf node homeNode where last_tuple was stored
  8:     For the rest $D-|P|-2$ new closed nodes, starting from homeNode's parent node and moving bottom-up, create their ALL cells and call the SuffixCoalesce Algorithm
  9:   end if
  10:  Create necessary nodes and cells for current_tuple {$D-|P|-1$ new nodes created}
  11:  last_tuple=current_tuple
  12: end while
  13: write special cell for the leaf node homeNode where last_tuple was stored
  14: For the other open nodes, starting from homeNode's parent node and moving bottom-up, create their ALL cells and call the SuffixCoalesce Algorithm For example, consider the fact table of Table 1 and the corresponding Dwarf cube of FIG. 1. The nodes in the figure are numbered according to the order of their creation. The first tuple <S1, C2, P2> creates three nodes (Nodes 1, 2 and 3) for the three dimensions (Store, Customer and Product) and inserts one cell to each node. Then the second tuple <S1,C3,P1> is read, which shares only the prefix S1 with the previous tuple. This means that cell C3 needs to be inserted to the same node as C2 (Node 2) and that the node containing P2 (Node 3) is now closed. The ALL cell for Node 3 is now created (the aggregation here is trivial, since only one other cell exists in the node). The third tuple <S2,C1,P1> is then read and contains no common prefix with the second tuple. One creates the ALL cell for Node 4 and call SuffixCoalesce for Node 2 to create the sub-dwarf of the node's ALL cell.

B. The Suffix Coalescing ("SuffixCoalesce") Algorithm

Suffix Coalescing usually creates the sub-dwarfs for the ALL cell of a node (a variant of SuffixCoalescing is also preferably used to update the Dwarf cube). Suffix Coalescing tries to identify identical dwarfs and coalesce their storage. Two or more dwarfs are "identical" if they are constructed by the same subset of the fact table's tuples. Prefix expansion would create a tree if it were not for Suffix Coalescing.

The SuffixCoalesce algorithm is presented in Algorithm 2. It requires as input a set of Dwarfs (inputDwarfs) and merges them to construct the resulting Dwarf. The algorithm makes use of the helping function "calculateAggregate," which aggregates the values passed as its parameter.

Algorithm 2 SuffixCoalesce Algorithm
  Input: inputDwarfs=set of Dwarfs
  1: if only one dwarf in inputDwarfs then
  2:   return dwarf in inputDwarfs {coalescing happens here}
  3: end if
  4: while unprocessed cells exist in the top nodes of inputDwarfs do
  5:   find unprocessed key $Key_{min}$ with minimum value in the top nodes of inputDwarfs
  6:   toMerge=set of Cells of top nodes of inputDwarfs having keys equal to $Key_{min}$
  7:   if already in the last level of structure then
  8:     write cell [$Key_{min}$ calculateAggregate(toMerge.aggregateValues)]
  9:   else
  10:    write cell [$Key_{min}$ SuffixCoalesce(toMerge.subdwarfs)]
  11:  end if
  12: end while
  13: create the ALL cell for this node either by aggregation or by calling SuffixCoalesce
  14: return position in disk where resulting dwarf starts SuffixCoalesce is a recursive algorithm that tries to detect at each stage whether some sub-dwarf of the resulting dwarf can be coalesced with some sub-dwarf of inputDwarfs. If there is just one dwarf in inputDwarfs, then coalescing happens immediately, since the result of merging one dwarf will obviously be the dwarf itself. The algorithm then repeatedly locates the cells toMerge in the top nodes of inputDwarfs with the smallest key $Key_{min}$ which has not been processed yet (using a priority queue). A cell in the resulting dwarf with the same key $Key_{min}$ needs to be created, and its content (sub-dwarf or aggregateValues) will be produced by merging the contents of all the cells in the toMerge set. There are two cases:

1. If at a leaf node, call the function calculateAggregate to produce the aggregate values for the resulting cell;
2. Otherwise, coalescing cannot happen at this level. Call SuffixCoalesce recursively to create the dwarf of the current cell, and check if parts of the structure can be coalesced at one level lower.

At the end, the ALL cell for the resulting node is created, either by aggregating the values of the node's cells (if this is a leaf node) or by calling SuffixCoallesce, with the sub-dwarfs of the node's cells as input.

As an example, consider again the Dwarf cube presented in FIG. 1, commencing at the step of the algorithm after all the tuples of Table 1 have been processed, and the ALL cell for Node 7 has been calculated. SuffixCoalesce is called to create the sub-dwarf of the ALL cell of Node 6. Since only one sub-dwarf exists in inputDwarfs (the one where C1 points to), immediate coalescing happens (case in Line 1) and the ALL cell points to Node 7, where C1 points to. Now, the sub-dwarf of the ALL cell for Node 1 is created. The cell C1 will be added to the resulting node, and its sub-dwarf will be created by recursively calling SuffixCoalesce, where the only input dwarf will be the one that has Node 7 as its top node. Therefore, coalescing will happen there. Similarly, cells C2 and C3 will be added to the resulting node one by one, and coalescing will happen in the next level in both cases, because just one of the inputDwarfs contains each of these keys. Then the ALL cell for Node 8 must be created (Line 13). The key P1 is included in the nodes pointed by C1 and C3 (Nodes 7,4), and since one is at a leaf node, one aggregates the values in the two cells (Line 8).

C. Other Methods for Suffix Coalescing

The algorithm SuffixCoalesce uses merging of sub-Dwarfs to create the Dwarf that corresponds to the ALL cell. Alternatively, one may sort the corresponding tuples in the fact table, as illustrated in Algorithm 3. For example, assume that the sub-Dwarfs for keys S1 and S2 (in node 1 of FIG. 1) have been created. Instead of merging the sub-Dwarfs of S1 and S2, one can sort the tuples of the fact table that correspond to node 1 (i.e. the whole fact table in our case) on the second dimension (since the Dwarf one is about to create corresponds to that dimension and above). For each distinct key of the second dimension in the sorted fact table (i.e. one of C1, C2, C3), Suffix Coalescing exists if and only if all the tuples that correspond to that key share a common prefix. In the example, for all the tuples containing the key C1 in the second dimension, the common prefix S1 exists, and therefore suffix coalescing will happen at this level for C1 (see FIG. 1).

Algorithm 3 SuffixCoalesceWithSort Algorithm

Input: range=tuples of the fact table that correspond to the ALL Dwarf one is about to create, curDim=current dimension 1: sort range on curDim+1 and above
2: foreach distinct key K in range
3: if tuples in range with key K share a common prefix {Suffix Coalesce}
4: write cell [K, pointer to the node that corresponds to the common prefix]
5: else
6: newRange=tuples with key K
7: newCurDim=curDim+1
8: write cell [K, SuffixCoalesceWithSort(newRange, newCurDim)]
9: end if
10: end for
11: create the ALL cell for this node either by aggregation or by calling SuffixCoalesceWithSort
12: return position in disk where resulting dwarf starts Algorithm 2 uses a top-down approach to identify Suffix Coalescing, while Algorithm 3 uses a bottom-up approach. Algorithm 2 is generally faster than Algorithm 3 since it operates on key values alone without the overhead of manipulating whole tuples. Algorithm 3 on the other hand is more localized, and therefore has better I/O behavior, since the tuples it operates on are always clustered together. In order to exploit the benefits of both algorithms, the hybrid approach (i.e., the "HybridSuffix Coalesce" algorithm) uses Algorithm 2 whenever the sub-Dwarfs are in the buffers and uses Algorithm 3 otherwise.

D. Optimizations

The structure as presented, is constructed in a symmetric way. The aggregates are always stored in the last level of the structure. A point query must descend a number of nodes before accessing the aggregates. For example, the query <S1, C1> and the query <S1> must access 3 nodes before finding the aggregate. Both queries are handled in the same way, i.e., effectively expanded to the full form: <S1, C1, ALL> and <S1, ALL, ALL>.

For paths of the form: <K1, K2, . . . , Kn, ALL, ALL, . . . , ALL> one can move the aggregates to the node of the $n^{th}$ level with key $K_n$ and therefore achieve better clustering and query performance for relative queries, since in many queries fewer nodes will need to be accessed.

E. Memory Requirements

The CreateDwarfCube algorithm has no major requirements, since it only needs to remember which was the tuple that was previously read. For the SuffixCoalescing algorithm, the priority queue (used to locate in Line 5 the cells with the minimum key), contains at each step one key from the top node of each dwarf in inputDwarfs. Since in the worst case, one will descend all D levels of the structure when creating the ALL cell for the root node, the memory requirements for the priority queue (which are the only memory requirements for the algorithm) in the worst case of a fully dense Dwarf cube are equal to:

$$MaxMemoryNeeded = c \cdot \sum_{i=1}^{D} Card_i$$

where c is the size of the cell. However, since the cube is usually sparse, the number of cells that must be kept in main memory will usually be much smaller than the sum of the dimensions' cardinalities, and the exact number depends on the branching factor at each level of the structure.

III. Updating the Dwarf Structure

A. Incremental Updates

The ability to refresh data, for example in a modern data warehouse environment, is currently more important than ever. As the data stored increases in complexity, the possibility of incrementally updating the data warehouse/datamart becomes essential. The "recompute everything" strategy cannot keep up the pace with the needs of a modern business. The most common strategy is using semi-periodic bulk updates of the warehouse, at specific intervals or whenever up-to-date information is essential.

In this section, a method is described for incrementally updating the Dwarf structure, given a set of delta tuples from the data sources and an earlier version of the Dwarf cube. It is assumed that the delta updates are much smaller in size compared to the information already stored. Otherwise, a bulk incremental technique that merges (Y. Kotidis and N. Roussopoulos. "An Alternative Storage Organization for ROLAP Aggregate Views Based on Cubetrees." In Proceedings of the ACM SIGMOD International Conference on Management of Data, pages 249–258, Seattle, Wash., June 1998) the stored aggregates with the new updates and stores the result in a new Dwarf might be preferable than the in-place method. Such an algorithm is described in the following section.

The incremental update procedure starts from the root of the structure and recursively updates the underlying nodes and finishes with the incremental update of the node that corresponds to the special ALL cell. By cross-checking the keys stored in the cells of the node with the attributes in the delta tuples, the procedure skips cells that do not need to be updated, expands nodes to accommodate new cells for new attribute values (by using overflow pointers), and recursively updates those sub-dwarfs which might be affected by one or more of the delta tuples.

Since the delta information is much less compared to the information already stored, the number of the cells that are skipped is much larger than the number of cells that need to be updated. One case requires special attention: by descending the structure, one can reach a coalesced node from different paths. Once one gets to the coalesced node, one must check if the coalesced path is still valid, since the insertion of one or more tuples might have caused the coalesced pointer to become invalid. In this case, the corresponding subdwarf has to be re-evaluated, and any new nodes have to be written to a different area of the disk. However, it is important to realize that an invalid coalesced pointer does not mean that the entire subdwarf needs to be copied again. Coalescing to nodes of the old dwarf will most likely happen just a few levels below in the structure, since only a small fraction of all the aggregate values calculated is influenced by the update.

An important observation is that frequent incremental update operations slowly deteriorate the original clustering of the Dwarf structure (the query performance of the Dwarf still remains far ahead of the closest competitor, as shown herein), mainly because of the overflow nodes created. This is an expected effect, encountered by all dynamic data structures as a result to online modifications. Since Dwarf is targeted for data warehousing applications that typically perform updates in scheduled periodic intervals, one can envision running a process in the background periodically for reorganizing the Dwarf and transferring it into a new file with its clustering restored.

B. Bulk Updates and Dwarf Reconstruction

Besides the incremental update algorithm, the dwarf structure can also be updated by preferably using a bulk update algorithm, or a dwarf reconstruction algorithm. Both of these algorithms construct a new Dwarf to store the resulting structure of the update procedure. Their main benefit is that the old Dwarf structure can be used to answer queries during the update procedure, since it is not modified, and that the resulting Dwarf is always perfectly clustered. Any of these algorithms might be preferred from the incremental update algorithm if the amount of update tuples is not significantly smaller than the amount of information already stored in the Dwarf structure.

The bulk update algorithm first constructs a delta dwarf from the update tuples. The update tuples are first ordered according to the dimension ordering of the old Dwarf. After the delta dwarf has been constructed, the old Dwarf and the delta Dwarf are merged into a new Dwarf by using a variant of the SuffixCoalesce Algorithm. The only difference lies in the case when only one sub-dwarf from either the old or the delta dwarf needs to be merged to create a resulting sub-dwarf. In the SuffixCoalesce algorithm, suffix coalescing would have happened in this case, and a pointer would be stored to the only sub-dwarf that contributes to the result. However, since each Dwarf is preferably written in a separate file, this cannot happen now. Instead, the only contributing sub-dwarf needs to be copied to the file of the new Dwarf, by appropriately traversing it.

The Dwarf Reconstruction algorithm, essentially queries the old Dwarf structure to extract the fact table that created it. This is done by requesting all the tuples of the view that contains the most detailed hierarchy level in each dimension. The extracted fact table is then merged with the updates (which should be modified to have the same dimension ordering with the ordering used in the old Dwarf), and the CreateDwarfCube algorithm is then called. This method has been shown to outperform the bulk update algorithm in our experiments.

IV. Dealing with Concatenated Rollup Cubes

The Dwarf structure of the present invention can be easily used to create, store, update and query concatenated rollup cubes. The required extensions in the Dwarf properties, and the construction algorithms for the case of concatenated rollup cubes are described below. As shown below, since the construction algorithm is very similar to the one of full cubes, the changes to the update algorithms, which are straightforward, are omitted.

A. Dwarf Properties

The properties of the Dwarf data structure in the case of concatenated rollup cubes are described below:

(1) It is a directed acyclic graph (DAG) with just one root node
(2) It has exactly D levels, where D is the number of cube's dimensions. Exactly one level of the structure is assigned to each dimension
(3) Each level consists of multiple "rollup representations", whose number is equal to the number of hierarchy levels of the dimension. Exactly one rollup representation is assigned to each hierarchy level of the dimension. The rollup representations are ordered from the one corresponding to the most detailed hierarchy level to the one corresponding to the least detailed hierarchy level.
(4) Nodes at the last level (leaf nodes) contain cells of the form: [key, aggregateValues]
(5) Nodes in levels other that the last level (non-leaf nodes) contain cells of the form: [key, pointer]. A cell C in a non-leaf node of level i points to a node at level i+1, which it dominates. The dominated node then has the node of C as its parent node.
(6) Each node also contains a special cell, which corresponds to the cell with the pseudo-value ALL as its key. This cell contains the aggregateValues when it corresponds to the most detailed rollup representation of the last level, or a pointer otherwise. In the latter case, the pointer targets a node at the next dimension if the node corresponded to the least detailed rollup representation of the dimension, or to a node of the next least detailed rollup representation otherwise.
(7) Cells belonging to nodes at level i of the structure contain keys that are values of the cube's $i^{th}$ dimension. No two cells within the same node contain the same key value.
(8) Each cell $C_i$ at the $i^{th}$ level of the structure, corresponds to the sequence $S_i$ of keys found in a path from the root to the cell's key. The actual number of the keys depends on the desired hierarchy level (counting from the most detailed towards the least detailed level) of each dimension, and is equal to:

$$\sum_{j=1}^{i} \min(desired\_level(j), total\_levels(j)).$$

Ths sequence corresponds to a group-by with D-i dimensions unspecified. All group-bys having sequence $S_i$ as their prefix, will correspond to cells that are descendants of $C_i$ in the Dwarf structure. For all these group-bys, their common prefix will be stored exactly once in the structure.

(9) When two or more nodes (either leaf or non-leaf) contribute the same nodes and cells to the structure, their storage is coalesced, and only one copy of them is stored. In such a case, the coalesced node will be reachable through more than one paths from the root, all of which will share a common suffix. For example, in the node at the bottom of the Product level of FIG. 1, the first cell of the node corresponds to the sequences <S1,C2,P2> and <ALL,C2,P2>, which share the common suffix <C2,P2>. If a node N is a coalesced node, then any node X which is a descendant of N will also be a coalesced node, since X can be reached through multiple paths passing through N.

In concatenated rollup cubes, a traversal in the Dwarf structure follows a path of length $$\sum_{j=1}^{D} \min(Lj, \text{total\_levels}(j)),$$

where Lj is the desired hierarchy level at dimension j, starting from the root to a leaf node, and has the following form (where ALL* represents a sequence of 0 or more ALL keys):

$$\{ALL^*,[Node_{L_1}.val\ |ALL]\}, \ldots, \{ALL^*, [Node_{L_D}.val\ |ALL]\}$$

meaning that a key found in the path will either be a value $Node_{L_1}.val$ at the $L_1$ rollup representation of the $i^{th}$ dimension, or the pseudo-value ALL. In level i of the structure, depending on the $i^{th}$ coordinate V of the group-by and the desired rollup representation at level $L_1$, one first traverses the pointers of ($L_1$−1) ALL cells, then locates the cell in the current node that has the desired value V as its key, and descends to the next level.

B. The CreateConcatenatedDwarf Algorithm

The CreateConcatenatedDwarf Algorithm is presented in Algorithm 4. Its only difference with the CreateDwarfCube Algorithm is that now the algorithm SuffixHiearchies is called, instead of the SuffixCoalesce algorithm. The reason is that all the rollup representations of the current level need to be constructed in this case.

Algorithm 4 CreateHierarchies Algorithm
  Input: sorted fact table, D: number of dimensions
  1: Create all nodes and cells for the first tuple
  2: last_tuple=first tuple of fact table
  3: while more tuples exist unprocessed do
  4: current tuple=extract next tuple from sorted fact table
  5: P=common prefix of current tuple, last_tuple
  6: if new closed nodes exist then
  7: write special cell for the leaf node homeNode where last_tuple was stored
  8: For the rest D−|P|−2 new closed nodes, starting from homeNode's parent node and moving bottom-up, create their ALL cells and call the SuffixHierarchies Algorithm
  9: end if
  10: Create necessary nodes and cells for current_tuple {D−|P|−1 new nodes created}
  11: last_tuple=current_tuple
  12: end while
  13: write special cell for the leaf node homeNode where last_tuple was stored
  14: For the other open nodes, starting from homeNode's parent node and moving bottom-up, create their ALL cells and call the SuffixHierarchies Algorithm C. The SuffixHierarchies Algorithm The SuffixHierarchies Algorithm is presented in Algorithm 5. It is a straightforward extension of the SuffixCoalesce algorithm. In order to create the rollup representations, it uses a function that returns for each key value Key of hierarchy H and current hierarchy level L, the value of the father of Key (its value in the immediate less detailed hierarchy level) in the declared hierarchy. This can be easily achieved by using a metadata manager which maps data items between levels. For example, for the hierarchy month→year, this function for the month 199601 might return the value 1996.

Algorithm 5 SuffixHierarchies Algorithm
  Input: inputDwarfs=set of Dwarfs, curLevel=current hierarchy level
  1: if curLevel=least_detailed then return SuffixCoalesce (inputDwarfs)
  2: while unprocessed cells exist in the top nodes of inputDwarfs do
  3: map the key value in the cell to the above hierarchy level
  4: end while
  5: while unprocessed values exist the mapped set
  6: find unprocessed key $Key_{min}$ with minimum value in the mapped set
  7: toMerge=set of Cells of top nodes of inputDwarfs having mapped keys equal to $Key_{min}$
  8: if already in the last level of structure then
  9: write cell [$Key_{min}$ calculateAggregate(toMerge.aggregateValues)]
  10: else
  11: write cell [$Key_{min}$ SuffixHierarchies(toMerge.subdwarfs)]
  12: end if
  13: end while
  14: create the ALL cell for this node either by aggregation or by calling SuffixHierarchies.
  15: return position in disk where resulting dwarf starts The algorithm proceeds as follows: If one has constructed all the rollup representations for this dimension then one is currently at the least detailed level of this hierarchy (Line 1). In this case, one simply calls SuffixCoalesce to construct the ALL cell of the node. Otherwise, one would want to create the following rollup representations (the ones corresponding to less detailed levels of the hierarchy). This can be achieved by using a procedure which recursively builds the next rollup representation. This is done by taking all the keys in the current node and mapping them to the above (less detailed) level, and recursively calling SuffixHierarchies to merge them. The recursion will stop when one reaches the least detailed level of the hierarchy.

Figure 13:
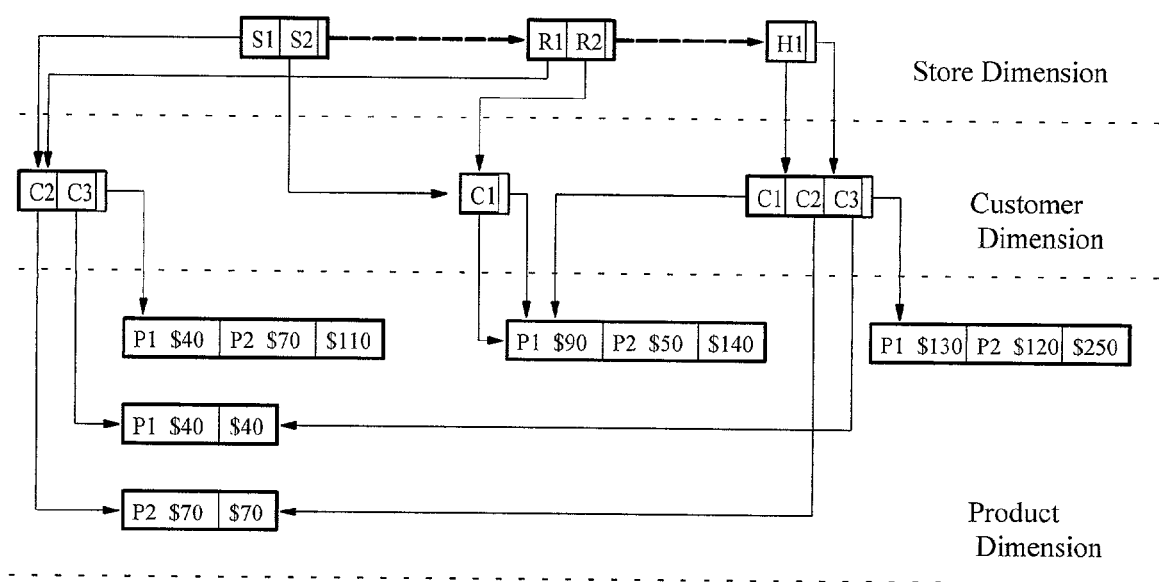
FIG. 13 is a diagram of the Dwarf Cube for Table 1, when the first dimension contains three hierarchy levels (store→retailer→channel).

FIG. 13 demonstrates an example for a rollup-concatenated cube with hierarchies. It is a simple modification of FIG. 1, when the store dimension contains three hierarchy levels; the base level store, the retailer and the channel hierarchy levels. For the purposes of this example, it is assumed that store S1 belongs to retailer R1 and the store S2 belongs to retailer R2. It is also assumed that the channel of both retailers R1 and R2 is H1. The store dimension now contains nodes for all three hierarchical levels. The bold dotted lines demonstrate the relation between the nodes as constructed by the SuffixHierarchies Algorithm.

V. Performance Issues in Dwarf Cubes

A. Clustering

Figure 6:
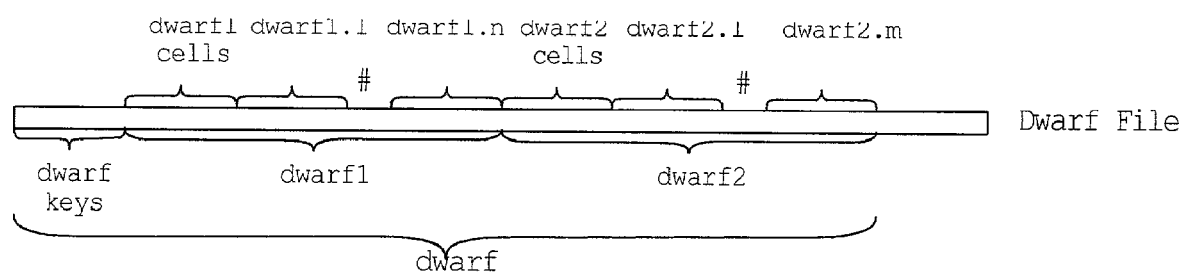
FIG. 6 illustrates the physical organization of a Dwarf cube.
Figure 7:
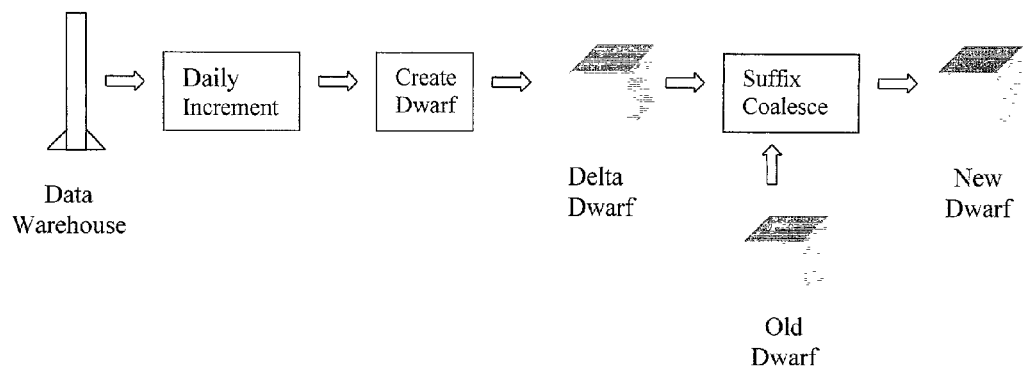
FIG. 7 illustrates the merge-pack update of Dwarf cubes.

In a preferred embodiment, the current implementation physically clusters the Dwarf cube on contiguous space to take advantage of the sequential disk scans during the creation and query time. FIG. 6, depicts the physical organization of a sample Dwarf. At the beginning of the construction of the Dwarf, its cells are stored in a sorted list. However, in the higher levels of the structure, nodes might contain a very large number of cells. Thus, if the cell's keys span several disk pages, then they are organized as a B+-tree, in order to provide more efficient key lookups. The sub-dwarfs: dwarf1 and dwarf2 in the example are stored immediately afterwards, and within each sub-dwarf, the same storage pattern is followed. This places aggregates sharing common prefixes in the same disk area. Since the sub-dwarfs are confined inside the disk "shadow" of the dwarf they belong to, the disk movement necessary to move at the beginning of a sub-dwarf decreases as one descends to lower levels of the structure, because the sizes of the lower sub-dwarfs decrease. Reduction of disk movement contributes to the performance of the cube's creation and the execution of queries. In sparse cubes, the lower parts of the structure typically contain very few cells and many levels of the structure fit in one disk page, thus reducing the number of disk pages needed when navigating the dwarf.

The write I/O during creation always appends on contiguous disk space. Some of the read I/O for the coalescing of nodes is out of sequence, but a series of optimization steps are taken to reduce it. These are described in the following sections.

B. Query Execution

A point query is a simple traversal on the Dwarf structure from the root to a leaf. At level i, one searches for the cell having as key the i-th coordinate value in the query and descend to the next level. If the i-th coordinate value is ALL, one follows the pointer of the ALL cell. A point query is fast simply because it involves exactly D node visits (where D is the number of dimensions). A key lookup at each level of the structure will return a pointer to the beginning of a sub-dwarf stored in the same direction the Dwarf cube was written. Some out of sequence I/O may happen because of a coalesced branch, but this can be handled efficiently with buffering.

Range queries differ from point queries in that they contain at least one dimension with a range of values. If a range is specified for the i-th coordinate, for each key satisfying the specified range, one recursively descends to the corresponding sub-dwarf in a depth-first manner. As a result, queries on the Dwarf structure have very small memory requirements (one pointer for each level of the structure).

While descending the Dwarf cubes structure for point queries, one almost always moves to the same direction in which one wrote the Dwarf cube. The same is true when one descends in range queries to each sub-dwarf of the cells satisfying the query's range. After descending in one sub-dwarf, the next sub-dwarf will be located to the "right" of it. For the same reason as in point queries, following a collapsed branch does not affect the query's performance. The query performance of Dwarf for both point and range queries is demonstrated in the experiments reported below.

According to the algorithms for constructing the Dwarf cube, certain views may span large areas of the disk. For example, for a 4-dimensional cube with dimensions a,b,c,d, view abcd is not clustered, since all views containing dimension a (views a,ab,ac,ad,abc,abd,acd) are all interleaved in the disk area that view abcd occupies. Therefore, a query with multiple large ranges on any of these views would fetch nodes that contain data for all these views. For this reason, one deviates from the construction algorithm, in order to cluster the Dwarf cube more efficiently. This is described in the following section.

C. Clustering Dwarf Cubes

The algorithms described above present the general principles for constructing Dwarf structures. However there is a lot of room for improvement as far as the clustering of the structure is concerned. As indicated, the algorithms do not cluster views of the cube together and therefore accessing one view requires accessing nodes that are probably on different disk pages that are too far apart from each other. In this section, a method is provided for creating the Dwarf structure in a very clustered manner. Typically, the clustered version of the dwarfs decreased the query response time in real datasets by a factor of 2 to 3.

Figure 4:
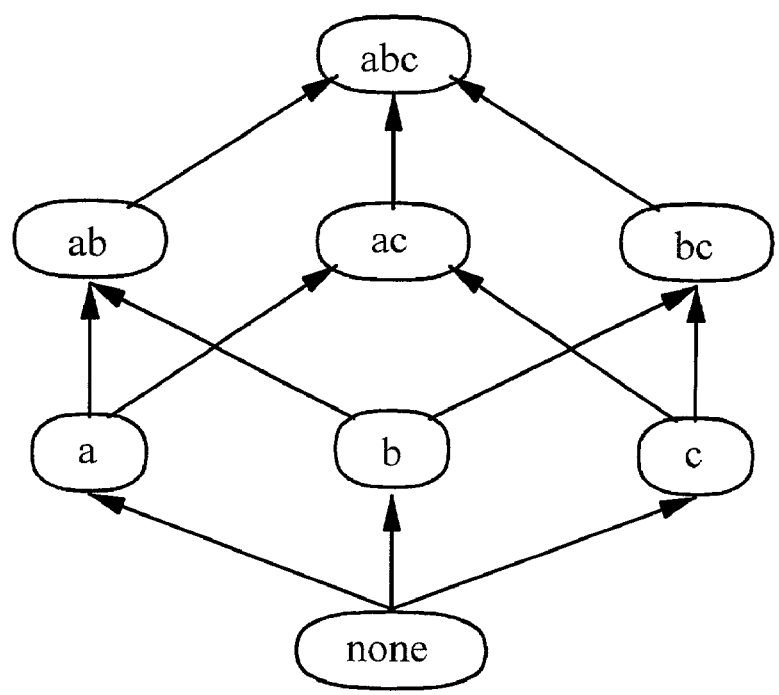
FIG. 4 provides a three dimensional lattice representation of a datacube.

The lattice representation (V. Harinarayan, et al., "Implementing Data Cubes Efficiently," In *Proc. of ACM SIGMOD*, pages 205–216, Montreal, Canada, June 1996)) of the Data Cube is used to represent the computational dependencies between the group-bys of the cube. An example for three dimensions is illustrated in FIG. 4. Each node in the lattice corresponds to a group-by (view) over the node's dimensions. For example, node ab represents the group-by ab view. The computational dependencies among group-bys are represented in the lattice using directed edges. For example, group-by a can be computed from the ab group-by, while group-by abc can be used to compute any other group-by. In FIG. 4, only dependencies between adjacent group-bys are shown, but reference is made to the transitive closure of this lattice.

In Table 2, an ordering of the views for a three dimensional cube is illustrated. The second column of the table contains a binary representation of the view with as many bits as the cube's dimensions. An aggregated dimension has the corresponding bit set to true(1). For example view ab corresponds to 001 since the dimension c is aggregated. The views are sorted in increasing order based on their binary representation.

Figure 5:
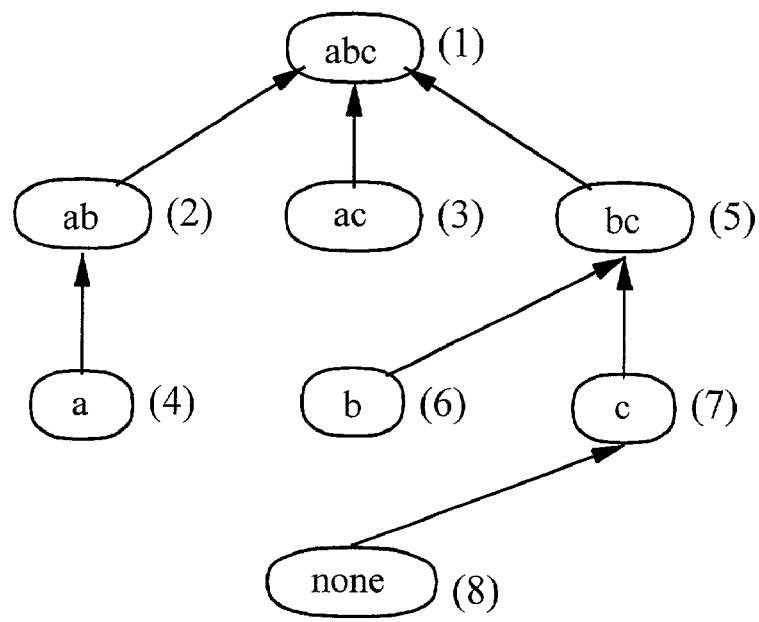
FIG. 5 demonstrates the processing tree for a three dimensional datacube.

This ordering has the property that whenever a view w is about to be computed, all the candidate ancestor views $v_i$ with potential for suffix coalescing have already been computed. Note that the binary representation for $v_i$ can be derived from the binary representation of w by resetting any one true bit (1) to false (0). This essentially means that the binary representation of $v_i$ is arithmetically less than the binary representation of w and therefore precedes that in the sorted ordering. For example, in Table 2, view w=a(011) has ancestors $v_1$=ab(001) and $V_2$=ac(010). FIG. 5 demonstrates the processing tree for the example in Table 2. In this order, the ancestor $v_i$ has been chosen to be used with the biggest common prefix for w.

TABLE 2

| View | Binary Rep | Parents w/ Coalesce |
|---|---|---|
| abc | 000 | |
| ab | 001 | abc |
| ac | 010 | abc |
| a | 011 | ab, ac |
| bc | 100 | abc |
| b | 101 | ab, bc |
| c | 110 | ac, bc |
| none | 111 | a, b, c |

By removing the recursion in the above-described algorithms (lines 8, 14 in the CreateDwarfCube algorithm, and line 13 in the SuffixCoalesce algorithm), one is able to create any one view of the cube. More specifically, the most detailed view (in the example abc) can be created with CreateDwarfCube, while any other view can be created with the SuffixCoalesce algorithm. Therefore it is easy to iterate through all the views of the cube using the described ordering and create each one of them. This procedure clusters nodes of the same view together and the resulting Dwarf structure behaves much better. For example, consider the structure in FIG. 1. If this structure is created using the above-described algorithms, then the nodes will be written in the order: 123456789. Note that node 5 that belongs to view <Store,ALL,Product> is written between nodes 4 and 6 that belong to view <Store,Customer,Product>, therefore destroying the clustering for both views. However, the procedure described here creates the nodes in the order 123467589, maintaining the clustering of each view. Table 3 describes in more detail the procedure.

TABLE 3

Example of Creating a Clustered Dwarf

| View | Binary Rep | Nodes |
|---|---|---|
| Store, Customer, Product | 000 | create 1, 2, 3, 4, 6, 7 |
| Store, Customer | 001 | close 3, 4, 7 |
| Store, Product | 010 | create 5, coalesce to 7 |
| Store | 011 | close 5, 7 |
| Customer, Product | 100 | create 8, coalesce to 7, 4, 3 |
| Customer | 101 | |
| Product | 110 | create 9 |
| none | 111 | create 9 |

D. Optimizing View Iteration

In one implementation of the methods of the present invention, a hybrid algorithm was used that does not need to iterate over all views. The hybrid algorithm takes advantage of the situation encountered while creating view <Store, Customer> or view <Store> as described in Table 3. Iterating over these two views did not create any new nodes, but rather closed the nodes by writing the ALL cell.

The situation is more evident in very sparse cubes (usually cubes of high dimensionalities). Assume a five dimensional cube with ten thousand tuples where each dimension has a cardinality of one hundred. Also assume that data values are uniformly distributed. The Dwarf representation of view abcde (00000) consists of five levels. The first level has only one node with one hundred cells. The second level for every cell of the first one has a node with another one hundred cells. The third level however (since it is assumed that the data are uniform and there only ten thousand tuples) has nodes that consist of only of one cell. Therefore one can close the corresponding cells right away. Thus, one avoid iterating on views abcd(00001), abce(00010), abc(00011) and abde(00100).

E. Coarse-Grained Dwarfs

Even though the Dwarf structure achieves remarkable compression ratios for calculating the entire cube, the Dwarf size can be, in cases of sparse cubes, quite larger than the fact table. However one can trade query performance for storage-space by using a granularity $G_{min}$ parameter. Whenever at some level of the Dwarf structure (during the Dwarf construction) the number of tuples that contributes to the subdwarf beneath the currently constructed node N of level L is less than $G_{min}$, then for that subdwarf, one does not compute any ALL cells. All the tuples contributing to this coarsegrained area below node N can be stored either in a tree-like fashion (thus exploiting prefix redundancy), or as plain tuples (which is useful if the number of dimensions D is much larger than L, to avoid the pointers overhead).

Notice that for all these tuples one needs to store only the last D–L coordinates, since the path to the collapsed area gives as the missing information. Each query accessing the coarse-grained area below node N will require to aggregate at most $G_{min}$ tuples to produce the desired result. The user can modify the $G_{min}$ parameter to get a Dwarf structure according to his/her needs.

VI. Validation of Dwarf Storage Expectations

Experiments with different datasets and sizes were performed to validate the storage and performance expectations of Dwarf. All tests were run on a single 700 Mhz Celeron processor running Linux 2.4.12 with 256 MB of RAM. A 30 GB disk rotating at 7200 rpms, able to write at about 8 MB/sec and read at about 12 MB/sec was used. Such "low-end" hardware was deliberately chosen in order to demonstrate the raw power of the Dwarf.

The implementation reads a binary representation of the fact table, where all values have been mapped to integer data (4 bytes). Unless specified otherwise, all datasets contained one measure attribute, and the aggregate function used throughout our experiments was the SUM function. The reported times are actual times and contain CPU and I/O times for the total construction of Dwarf cubes including the initial sorting of the fact table.

In the experiments, Dwarf was compared to Cubetrees, as far as storage space, creation time, queries and update performance are concerned. In (Y. Kotidis and N. Roussopoulos, "An Alternative Storage Organization for ROLAP Aggregate Views Based on Cubetrees," In Proceedings of the ACM SIGMOD International Conference on Management of Data, pages 249–258, Seattle, Wash., June 1998) Cubetrees were shown to exhibit at least 10 times faster query performance when compared to indexed relations, half the storage a commercial relational system requires and at least 100 times faster update performance. Since no system has been shown to outperform the Cubetrees so far, it is concluded that this was the most challenging test for Dwarf.

One of the internal challenges was to shrink a Petacube of 25 dimensions each with cardinality 1000 and a fact table of 600,000 tuples. The Petacube has an BSF of more than one petabyte. The Dwarf Petacube is 2.3 GB and took less than 20 minutes to create.

A. Synthetic Datasets

In this set of experiment the benefits of eliminating prefix redundancy, and using suffix coalescing when computing the CUBE operator were explored. For the first subset of such experiments, a binary storage footprint (BSF) was used as a means of comparison. The BSF representation models the storage required to store the views of the cube in unindexed binary relations. This representation was also used by K. Beyer and R. Ramakrishnan, "Bottom-Up Computation of Sparse and Iceberg CUBEs," In *Proc. of the ACM SIGMOD Conf.*, pages 359–370, Philadelphia, Pa., USA, 1999 to estimate the time needed to write out the output of the cube.

TABLE 4

Storage and Creation Time vs #Dimensions

| | | Uniform | | | 80-20 | |
|---|---|---|---|---|---|---|
| #Dims | BSF | Dwarf w/prefix only | Dwarf | Time (sec) | Dwarf (MB) | Time (sec) |
| 10 | 2333 MB | 1322 MB | 62 MB | 26 | 115 | 46 |
| 15 | 106 GB | 42.65 GB | 153 MB | 68 | 366 | 147 |

TABLE 4-continued

Storage and Creation Time vs #Dimensions

| | | Uniform | | | 80-20 | |
|---|---|---|---|---|---|---|
| #Dims | BSF | Dwarf w/prefix only | Dwarf | Time (sec) | Dwarf (MB) | Time (sec) |
| 20 | 4400 GB | 1400 GB | 300 MB | 142 | 840 | 351 |
| 25 | 173 TB | 44.8 TB | 516 MB | 258 | 1788 | 866 |
| 30 | 6.55 PB | 1.43 PB | 812 MB | 424 | 3063 | 1529 |

Figure 8:
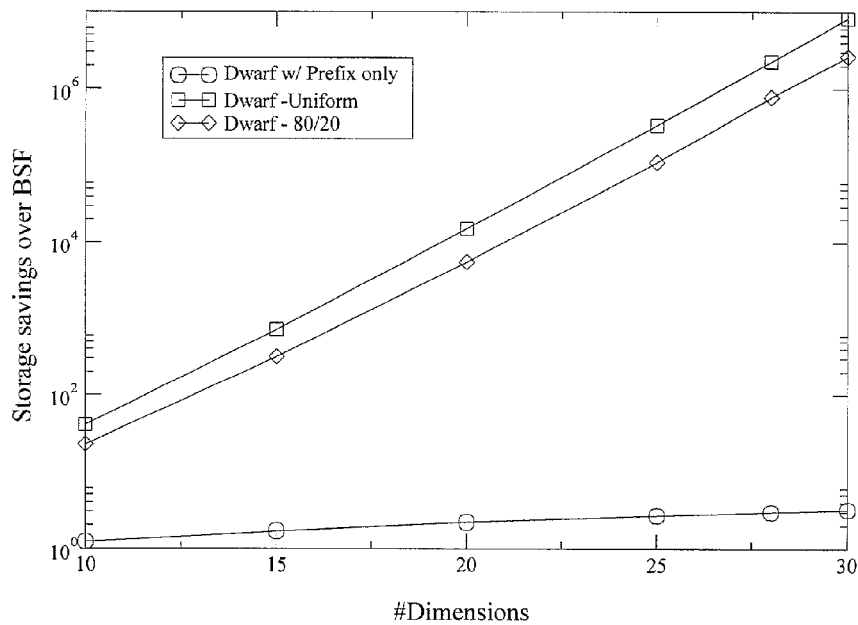
FIG. 8 shows the compression over the BSF size as the number of dimensions increases for a synthetic database.

Table 4 shows the storage and the compute time for Dwarf cubes as the number #Dims of dimensions range from 10 to 30. The fact table contained 100,000 tuples and the dimension values were either uniformly distributed over a cardinality of 1,000 or followed a 80-20 Self-Similar distribution over the same cardinality. No correlation was imposed among the dimensions. The BSF column shows an estimate of the total size of the cube if its views were stored in unindexed relational tables. The "Dwarf w/Prefix only" column shows the storage of the Dwarf with the suffix coalescing off, and therefore, without suffix redundancy elimination. To measure the BSF size and the "Dwarf w/Prefix only" size, the Dwarf with the suffix coalescing turned on was generated, and then the Dwarf structure was traversed appropriately. The BSF and the "Dwarf w/prefix only" storage was counted for both distributions and the results (as far as the savings are concerned) were almost identical—slightly smaller savings for the 80-20 distribution—, so only the uniform sizes are presented. The remaining four columns show the Dwarf store footprint and the time to construct it for each of the two distributions. FIG. 8 shows the compression over the BSF size as the number of dimensions.

Table 5 gives the Dwarf storage and computation time for a 10-dimensional cube when the number of tuples in the fact table varies from 100,000 to 1,000,000. The cardinalities of each dimension are 30,000, 5,000, 5,000, 2,000, 1,000, 1,000, 100, 100, 100 and 10. The distribution of the dimension values were either all uniform or all 80-20 self-similar. This set of experiments shows that the store size and computation time grow linearly in the size of the fact table (i.e. doubling the input tuples results in a little more than twice the construction time and storage required).

TABLE 5

Storage and Time Requirements vs #Tuples

| | Uniform | | 80-20 | |
|---|---|---|---|---|
| #Tuples | Dwarf (MB) | Time (sec) | Dwarf (MB) | Time (sec) |
| 100,000 | 62 | 27 | 72 | 31 |
| 200,000 | 133 | 58 | 159 | 69 |
| 400,000 | 287 | 127 | 351 | 156 |
| 600,000 | 451 | 202 | 553 | 250 |
| 800,000 | 622 | 289 | 762 | 357 |
| 1,000,000 | 798 | 387 | 975 | 457 |

Several important observations can be made on this set of experiments:

Elimination of prefix redundancy saves a great deal but suffix redundancy is clearly the dominant factor in the overall performance.

The compute/creation time is proportional to the Dwarf size.

The uniform distribution posts the highest savings. The effect of skew on the cube is that most tuples from the fact table contribute to a small part of the whole cube while leaving other parts empty. The denser areas benefit from prefix elimination which is smaller, and sparser areas (with empty pockets) have less suffix redundancy to eliminate.

B. Comparison with Full Cubetrees

Figure 9:
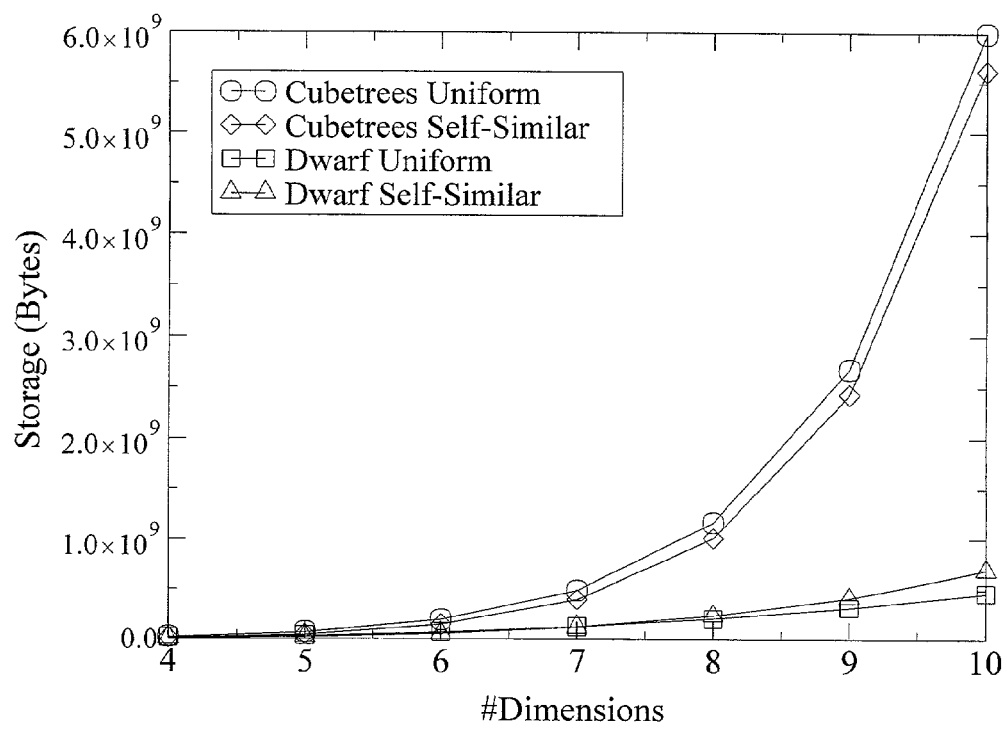
FIG. 9 shows the relationship between storage space and #Dims for uniform and self-similar Dwarfs and Cubetrees.
Figure 10:
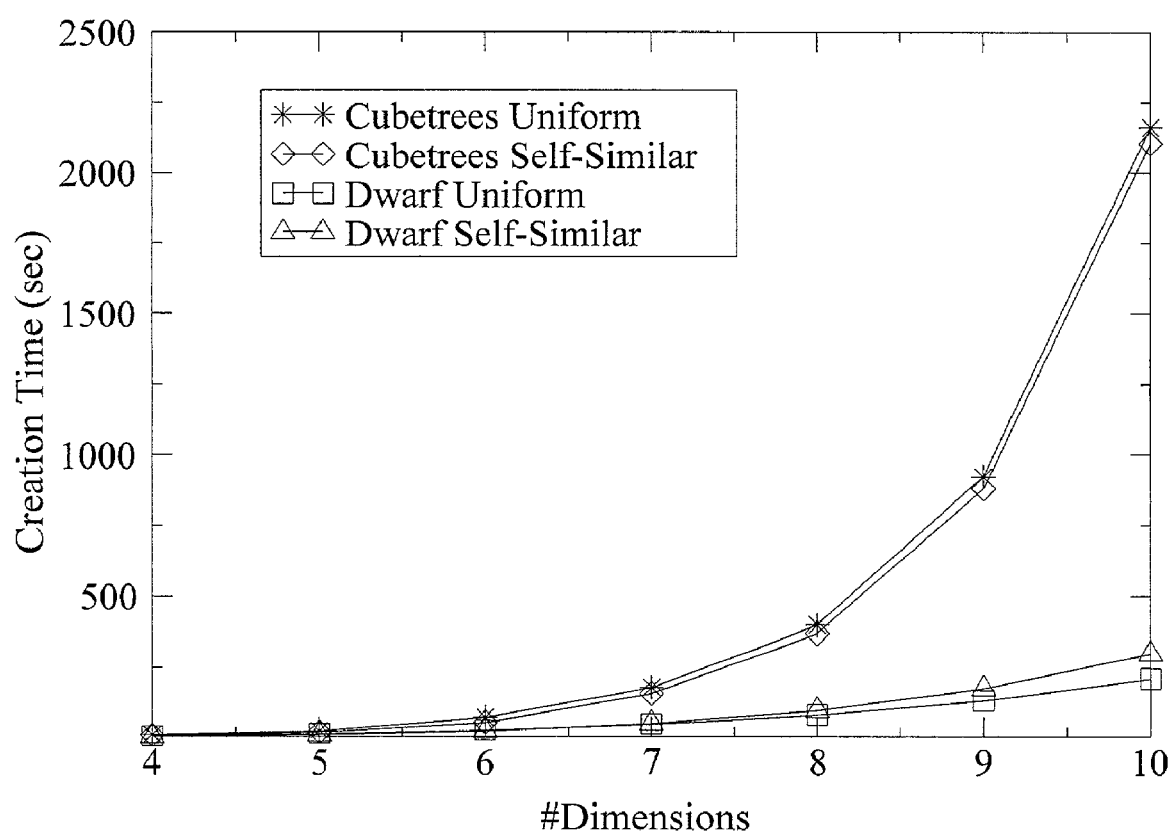
FIG. 10 shows the relationship between construction time space and #Dims for uniform and self-similar Dwarfs and Cubetrees.

In order to compare the performance of Dwarf with that of Cubetrees, cubes of 4 to 10 dimensions were created. In each case, the fact table contained 250,000 tuples created by using either a uniform, or a 80-20 self-similar distribution. FIG. 9 shows the space required for Dwarf and for Cubetrees to store the entire cube. FIG. 10 shows the corresponding construction times. From these two Figures, one can see that:

Cubetrees do not scale, as far as storage space is concerned, with the number of dimensions. On the contrary, Dwarf requires much less space to store the same amount of information.

Dwarf requires significantly less time to build the cube. This is because Cubetrees (like other methods that calculate the entire cube) perform multiple sorting operations on the data, and because Dwarf avoids computing large parts of the cube, since suffix coalescing identifies parts that have already been computed.

C. Comparison to Reduced Cubetrees

This experiment compares the construction time of Dwarf with that of Cubetrees when the Cubetrees size is limited to that of the Dwarf structure. This type of Cubetree is referred to herein as a reduced Cubetree. This is useful to examine, since in many cases of high-dimensional data, Cubetrees (and most other competitive structures) may not fit in the available disk space. Since the Cubetrees will not store all the views of the CUBE operator, one must make a decision of which views to materialize. The PBS algorithm (A. Shukla, P. M. Deshpande, and J. F. Naughton. Materialized View Selection for Multidimensional Datasets. In *Proc. of the 24th VLDB Conf.*, pages 488–499, New York City, N.Y., August 1998) provides a fast algorithm to decide which views to materialize under a given storage constraint, while at the same time guaranteeing good query performance. The PBS algorithm selects the smallest views in size, which are typically the views that have performed the most aggregation. In addition, the fact table has been stored in the reduced Cubetrees, in order for them to be able to answer queries (in the Queries section) on views which are not materialized or cannot be answered from other materialized views.

TABLE 6

Comparison Between Cubetree and Dwarf
Storage and Creation Time for Real Datasets

| Dataset | # Dims | #Tuples | Size (MB) | Cubetree Time (sec) | Dwarf Time (sec) | PBS Views |
|---|---|---|---|---|---|---|
| Meteo-9 | 9 | 348,448 | 66 | 64 | 35 | 63 of 512 |
| Forest | 10 | 581,012 | 594 | 349 | 350 | 113 of 1024 |
| Meteo-12 | 12 | 348,448 | 358 | 451 | 228 | 310 of 4096 |

Table 6 gives the Dwarf and Cubetree storage and creation times for three real datasets. Cubetrees were created having the same size as the corresponding Dwarfs. The construction times of the reduced Cubetrees do not include the running time for the PBS algorithm. Table 6 also shows the number of views contained in the reduced Cubetrees. The first real dataset contains weather conditions at various weather stations on land for September 1985 (C. Hahn, et al., Edited synoptic cloud reports from ships and land stations over the globe. http://cdiac.esd.ornl.gov/cdiac/ndps/ndp026b.html)). From this dataset, two sets were created (Meteo-9 and Meteo-12) of input data: one which contained 9 dimensions, and one with 12 dimensions. The second real data-set contains "Forest Cover Type" data (Jock A. Blackard, "The Forest CoverType Dataset." ftp://ftp.ics.uci.edu/pub/machine-learning-databases/covtype) which includes cartographic variable that are used to estimate the forest cover type of land areas. In all data sets some of the attributes were skewed and among some dimensions there was substantial correlation. Even though the reduced Cubetrees calculate significantly fewer views that Dwarf does, Dwarf cubes are significantly faster at their creation for the two Weather datasets, and took the same amount of time as the Cubetrees for the Forest dataset. One important observation is that the Dwarf structure for the Weather dataset with 12 dimensions is smaller, and faster to compute than the Dwarf for the Forest data, which had 10 dimensions. The top three dimensions in the Weather data were highly correlated and suffix coalescing happened at the top levels of the Dwarf structure in many cases, thus providing substantial space and computational savings.

D. Query Performance Comparison of Dwarfs and Cubetrees

In this section, the results of studies of the query performance of Dwarfs as compared to full or reduced Cubetrees is presented, along with a detailed analysis of how range queries, applied to different levels of the Dwarf structure, are treated by both the clustered and unclustered structure.

1. Dwarfs vs Full Cubetrees

Two workloads of 1,000 queries were created, and the previously created full cubes of 4–10 dimensions with 250,000 tuples were queried. The description of the workloads is shown in Table 7.

TABLE 7

Workload Characteristics for Dwarfs vs Full Cubetrees Query Experiment

| Workload | #Queries | Probabilities | | | Range | |
|---|---|---|---|---|---|---|
| | | $P_{newQ}$ | $P_{dim}$ | $P_{pointQ}$ | Max | Min |
| A | 1,000 | 0.34 | 0.4 | 0.2 | 20% | 1 |
| B | 1,000 | 1.00 | 0.4 | 0.2 | 20% | 1 |

Since other query workloads will also be given in tables similar to Table 7, the following description is provided of the notation used. An important thing to consider is that in query workloads to either real data, or synthetic data produced by using the uniform distribution, the values specified in the queries (either point values, or the endpoints of ranges) are selected by using a uniform distribution. Otherwise, the 80/20 Self-Similar distribution is used to produce these values. This is more suitable, since a user will typically be more interested in querying the denser areas of the cube.

| | |
|---|---|
| $P_{newQ}$ | is the probability that the new query will not be related to the previous query. In OLAP applications, users typically perform a query, and then often execute a series of roll-up or drill-down queries. In the present invention, when the query generator produces a query, it produces a roll-up query with probability $(1 - P_{newQ})/2$, a drill-down query with the same probability or a new query with probability $P_{newQ}$. For example, Workload B creates only new (unrelated) queries, while Workload A creates a roll-up or a drill-down with a probability of 0.33 each. |
| $P_{dim}$ | is the probability that each dimension will be selected to participate in a new query. For example, for a 10-dimensional cube, if the above probability is equal to 0.4, then new queries will include $10 \times 0.4 = 4$ dimensions on average. |
| $P_{pointQ}$ | is the probability that just a single value will be specified for each dimension participating in a query. Otherwise, with probability $1 - P_{pointQ}$, a range of values will be specified for that dimension. In such a manner, one can control the selectivity of the queries: a value of 1 produces only point queries, and a value of 0 produces queries with ranges in every dimension participating in the query. Typically, low values were selected for this parameter, since a high value would in most instances return only a few tuples (usually 0). |
| Range | The range for a dimension is uniformly selected to cover a specified percentage of the cardinality of the dimension. For example, if a dimension a has values ranging from 1 to 1,000, a 20% value maximum range will force any range of dimension a to be limited to at most 200 values. Each range contains at least one value. |

Figure 11:
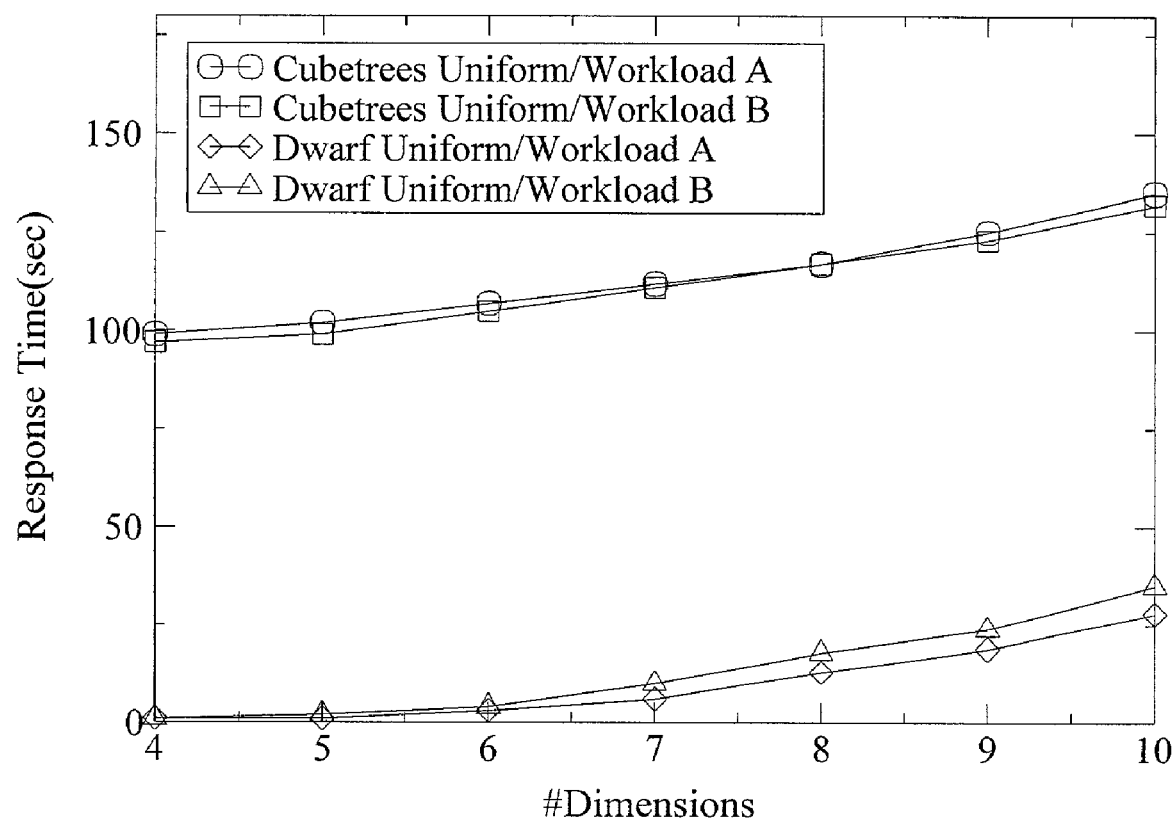
FIG. 11 shows query time for uniform data for uniform and self-similar Dwarfs and Cubetrees.
Figure 12:
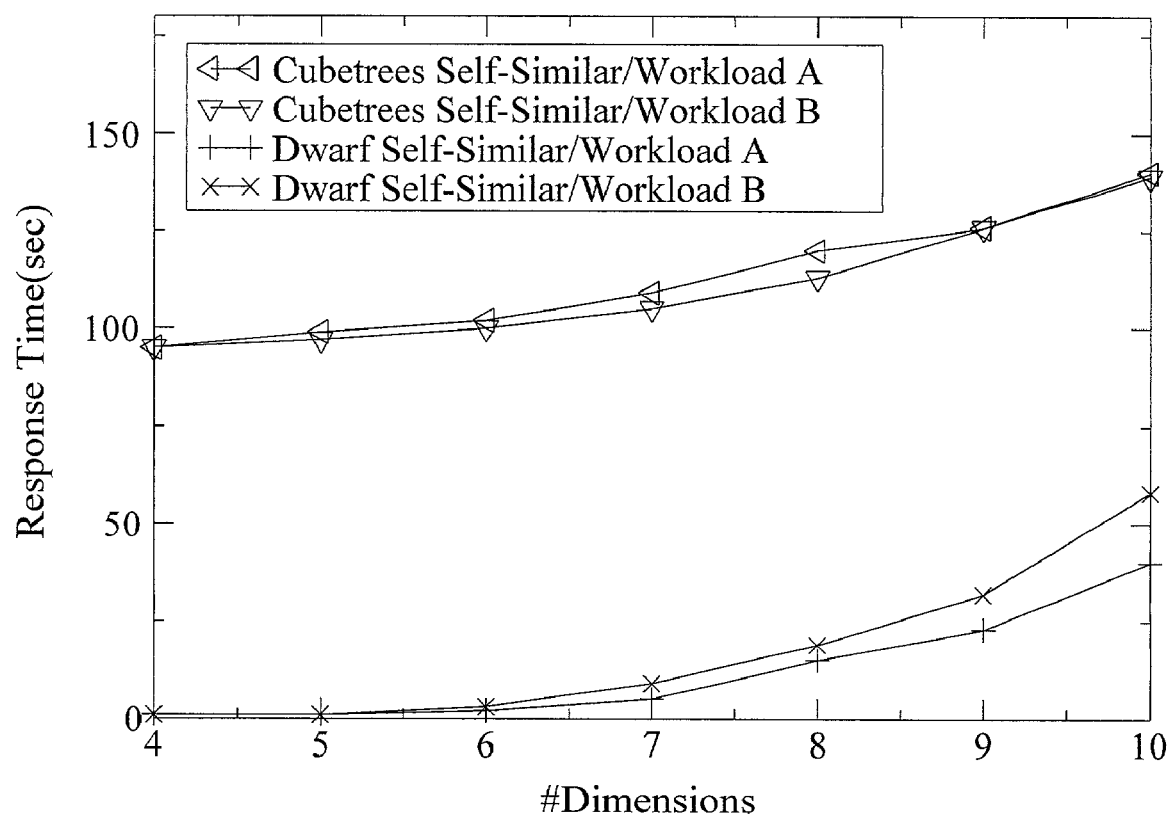
FIG. 12 shows query time for self-similar data for uniform and self-similar Dwarfs and Cubetrees.

The results for the workloads of Table 7 on the above-described cubes are shown in FIG. 11 and FIG. 12. Dwarf outperforms Cubetrees in all cases, and for small-dimensionality Dwarf cubes are 1–2 orders of magnitude faster. The main advantage of Dwarf cubes is their condensed storage, which allows them to keep in main memory a lot more information than Cubetrees can. Moreover, it can be seen that Dwarf performs better in workload A, because roll-up and drill-down queries have a common path in the Dwarf structure with the previously executed query, and thus the disk pages corresponding to the common area are already in main memory. For example, for the 10-dimensional cases, in the Uniform dataset the response time drops from 35 to 28 seconds when roll-up and drill-down operations are used (a 20% reduction), while for the Self-Similar case the improvement is even larger: from 58 to 40 seconds. This is a 31% reduction in response time.

2. Dwarfs vs Reduced Cubetrees

In a second series of experiments, the query performance of Dwarfs was compared to that of reduced Cubetrees using the above-described Meteo-9, Meteo-12, and Forest datasets. Since Cubetrees in this case did not contain all the views of the cube, queries on non-materialized views were answered in the following manner. When a query on a non-materialized view v is issued, the Cubetree optimizer picks the best materialized view w to answer v. If v does not share a common prefix with w, then it uses a hash-based approach to evaluate the query. If, however, v shares a common prefix with w, then the result is calculated on the fly, taking advantage of the common sort order. The second case is much faster than using a hash-table. The Cubetree optimizer needs estimates for the size of all views, but in the present experiments the exact sizes were determined by issuing appropriate queries to the Dwarf structure.

For each real dataset 5 workloads of 2000 queries were created. The characteristics of these workloads is shown in Table 8. In Table 8, the #Dims column denotes the average number of dimensions specified on each query. Notice that workloads C and E are similar to workloads B and D, respectively, but contain no roll-up/drill-down queries.

TABLE 8

Workload Characteristics for Dwarfs vs Reduced Cubetrees Query Experiment

| Workload | #Queries | $P_{newQ}$ | #Dims | $P_{pointQ}$ | $Range_{max}$ |
|---|---|---|---|---|---|
| A | 2,000 | 0.34 | 4 | 0.1 | 15% |
| B | 2,000 | 0.34 | 4 | 0.5 | 25% |
| C | 2,000 | 1.00 | 4 | 0.5 | 25% |
| D | 2,000 | 0.34 | 3 | 0.5 | 25% |
| E | 2,000 | 1.00 | 3 | 0.5 | 25% |

The query performance of Dwarf and the reduced Cubetrees is presented in Table 9. Dwarf is about an order of magnitude faster than the reduced Cubetrees in the Weather datasets Meteo-9, Meteo-12), and 2–3 times faster in the Forest dataset. Dwarf performs significantly better in the Weather datasets due to the correlation of the attributes in these datasets. Because coalescing happened at the top levels of the structure, a large fraction of nodes at the top levels were cached, thus improving performance dramatically.

An important observation is that Dwarfs are faster when the workload contains roll-up/drill-down queries. For example, for workloads D and E of the forest dataset, Dwarf was 17% faster. Also notice that in this type of workloads the limitation of the average number of dimensions specified in each query, favors Cubetrees, which typically store views with up to 3 dimensions, because of the PBS algorithm. For workloads with queries containing more dimensions, on average, the performance of the Cubetrees was significantly worse.

TABLE 9

Query Times in Seconds for 2,000 Queries on Real Datasets

| | Reduced Cubetrees | | | Dwarf | | |
|---|---|---|---|---|---|---|
| Workload | Meteo-9 | Meteo-12 | Forest | Meteo-9 | Meteo-12 | Forest |
| A | 305 | 331 | 462 | 13 | 34 | 150 |
| B | 292 | 346 | 478 | 13 | 39 | 176 |
| C | 304 | 340 | 483 | 13 | 44 | 208 |
| D | 315 | 301 | 427 | 12 | 47 | 217 |
| E | 305 | 288 | 448 | 15 | 49 | 262 |

3. Evaluating Ranges in Dwarf Cubes

An initial concern when designing Dwarf was to ensure that their query performance would not suffer on queries with large ranges on the top dimensions of the structure. The dimensions on the higher levels of the Dwarf structure have higher cardinalities, and thus a large range on them (for example a range containing 20% of the values) might be expensive because a large number of paths would have to be followed. In the following experiment, the query behavior of Dwarf, when queries with ranges in different dimensions are issued, was studied.

For such analysis, four 8-dimensional datasets, each having a fact table of 800,000 tuples, were created. For the first 2 datasets ($A_{uni}$, $A_{80/20}$), each dimension had a cardinality of 100. For the last 2 datasets ($B_{uni}$, $B_{80/20}$), the cardinalities of the dimensions were: 1250, 625, 300, 150, 80, 40, 20 and 10. The underlying data used in datasets $A_{uni}$ and $B_{uni}$ was produced by using a Uniform distribution, while for the other 2 datasets an 80-20 Self-Similar distribution was used. For reference, the sizes of the Dwarf cubes for the $A_{uni}$ and $A_{80/20}$ datasets were 777 and 780 MB, while for the $B_{uni}$ and $B_{80/20}$ datasets the corresponding sizes were 490 and 482 MB.

Workloads of queries, where three consecutive dimensions would contain ranges on them, were created. For example, if the cube's dimensions are $a_1 a_2, \ldots, a_8$, then the first workload would always contain ranges on dimensions $a_1 a_2 a_3$, the second workload on dimensions $a_2 a_3 a_4 \ldots$ Ranges were also considered on dimensions $a_7 a_8 a_1$ and on $a_8 a_1 a_2$. Each workload contained 1,000 queries. Since a set of three dimensions was always queried in each workload, a point query was issued on the remaining dimensions with probability 30%-otherwise the ALL value is selected. Having point queries on few dimensions allowed the queries to "hit" different views while the three ranged dimensions remained the same, and the small probability with which a point query on a dimension happens allowed for multiple tuples to be returned for each query. Each range on a dimension contained 5–15% of the dimension's values. The results for datasets $A_{uni}$ and $A_{80/20}$ are presented in Table 10, and for datasets $B_{uni}$ and $B_{80/20}B$ in Table 11. To view the effect of clustering on Dwarf cubes, the query times achieved by Dwarf when using the original CreateDwarfCube and SuffixCoalesce algorithms, without improving clustering are presented. The corresponding structure is referred to herein as "Unclustered Dwarfs". For comparison reasons, the corresponding query times for the full Cubetrees (to minimize the effect of online aggregation) is also provided.

The manner in which the query performance of Dwarf cubes is influenced by the location of ranges is discussed below. The behavior of Cubetrees was explained in Y. Kotidis and N. Roussopoulos, "An Alternative Storage Organization for ROLAP Aggregate Views Based on Cubetrees," In Proceedings of the ACM SIGMOD International Conference on Management of Data, pages 249–258, Seattle, Wash., June 1998.

TABLE 10

Time in Seconds for 1,000 Queries on Datasets with Constant Cardinality

| | $A_{uni}$ | | | |
|---|---|---|---|---|
| Ranged Dims | Cubetrees (sec) | Dwarf (sec) | Unclustered Dwarf (sec) | Result Tuples |
| 1, 2, 3 | 142 | 8 | 20 | 60,663 |
| 2, 3, 4 | 126 | 9 | 21 | 78,587 |
| 3, 4, 5 | 117 | 10 | 37 | 65,437 |
| 4, 5, 6 | 113 | 13 | 41 | 78,183 |
| 5, 6, 7 | 110 | 18 | 53 | 72,479 |
| 6, 7, 8, | 109 | 22 | 39 | 69,165 |
| 7, 8, 1 | 126 | 28 | 53 | 71,770 |
| 8, 1, 2 | 134 | 17 | 19 | 86,547 |

| | $A_{80/20}$ | | | |
|---|---|---|---|---|
| Ranged Dims | Cubetrees (sec) | Dwarf (sec) | Unclustered Dwarf (sec) | Result Tuples |
| 1, 2, 3 | 170 | 13 | 18 | 158,090 |
| 2, 3, 4 | 147 | 15 | 18 | 150,440 |
| 3, 4, 5 | 128 | 15 | 22 | 162,875 |
| 4, 5, 6 | 114 | 16 | 42 | 165,284 |
| 5, 6, 7 | 108 | 17 | 42 | 150,926 |
| 6, 7, 8, | 104 | 13 | 18 | 163,357 |
| 7, 8, 1 | 119 | 23 | 23 | 153,532 |
| 8, 1, 2 | 154 | 19 | 19 | 155,837 |

In Table 10, for the uniform workload $A_{uni}$ and the clustered Dwarf, one can observe that the query performance decreases as the ranges move to lower dimensions. In this case, the query values (either point, or ALL), on dimensions above the ranged ones, randomly hit different nodes at the upper levels of the structure. This has the effect that consecutive queries can follow paths in vastly different locations of the Dwarf file. Since the Dwarf does not fit into main memory, the larger the area targeted by queries of each workload, the more swapping that takes place to fetch needed disk pages to main memory, and the worse the query performance. Thus, the performance degrades as the queries move towards the lower levels, because a larger area of the Dwarf file is targeted by the queries, and caching becomes less effective.

In this regard, it is useful to clarify that a single query with ranges on the top dimensions is more expensive than a single query with ranges on the lower dimensions. However, consecutive queries involving ranges on the top levels of the structure benefit more from caching, since after a few queries the top level nodes where the ranges are applied will be in main memory. This is why this kind of queries exhibited better performance in the experiment.

The same behavior can be observed for the unclustered Dwarf, with one exception, the 6,7,8 ranges. In this case the benefits of the reduced per-query cost seem to outweigh the cache effects resulting in better overall performance.

Overall, the unclustered Dwarf performs much worse than the clustered one—although still much better compared to Cubetrees. The reason for the worse behavior of the unclustered Dwarf is (as mentioned above) the interleaving of the views. This has the result that most disk pages fetched contain "useless" information for the query, and thus more pages need to be fetched when compared to the clustered Dwarf.

The above concepts can help explain the behavior of the Dwarf structure for the wrapped queries on dimensions 8,1,2 and 7,8,1. The ranges at the top dimensions benefit the cache performance but increase the per-query cost. The tradeoff between the two determines the overall performance.

A similar behavior can be observed for the $A_{80/20}$ workload. In this case the queries address denser areas compared to that of the uniform case, as the returned tuples and the overall performance demonstrate. Dwarf performs similarly to the $A_{uni}$ case.

TABLE 11

Time in Seconds for 1,000 Queries on Datasets with Constant Cardinality

| | $B_{uni}$ | | | |
|---|---|---|---|---|
| Ranged Dims | Cubetrees (sec) | Dwarf (sec) | Unclustered Dwarf (sec) | Result Tuples |
| 1, 2, 3 | 206 | 20 | 37 | 96,383 |
| 2, 3, 4 | 164 | 11 | 25 | 106,879 |
| 3, 4, 5 | 130 | 11 | 22 | 106,073 |
| 4, 5, 6 | 112 | 14 | 19 | 56,261 |
| 5, 6, 7 | 105 | 16 | 15 | 12,327 |
| 6, 7, 8 | 103 | 17 | 12 | 2,773 |
| 7, 8, 1 | 180 | 19 | 73 | 47,436 |
| 8, 1, 2 | 180 | 24 | 37 | 115,291 |

TABLE 11-continued

Time in Seconds for 1,000 Queries on Datasets with Constant Cardinality

| | $B_{80/20}$ | | | |
|---|---|---|---|---|
| Ranged Dims | Cubetrees (sec) | Dwarf (sec) | Unclustered Dwarf (sec) | Result Tuples |
| 1, 2, 3 | 271 | 66 | 87 | 2,582,365 |
| 2, 3, 4 | 183 | 29 | 38 | 1,593,427 |
| 3, 4, 5 | 129 | 13 | 17 | 427,202 |
| 4, 5, 6 | 107 | 12 | 16 | 85,862 |
| 5, 6, 7 | 99 | 10 | 8 | 21,808 |
| 6, 7, 8 | 96 | 9 | 8 | 5,173 |
| 7, 8, 1 | 165 | 19 | 39 | 93,139 |
| 8, 1, 2 | 228 | 28 | 34 | 98,998 |

Table 11 presents the query performance of Dwarf for the datasets $B_{uni}$ and $B_{80/20}$. The extra parameter—and the dominating one—to be considered here is the different cardinalities, as a range (i.e. 10%) on the top dimension contains much more values than the same range does in any other dimension. The effect of the different cardinalities is more evident in the $B_{80/20}$ workload. This happens because a given range will be typically satisfied by a lot more values than in the uniform case (recall that 80% of the values exist in 20% of the space). This is evident from both the number of result tuples, and from the query performance which improves when the queries are applied to dimensions with smaller cardinalities. However the basic concepts described for Table 10 apply here as well.

4. Coarse-Grained Dwarfs

As described above, one can limit the space that Dwarf occupies and subsequently computation time, by appropriately setting the minimum granularity ($G_{min}$) parameter. In this set of experiments, the manner in which construction time, space, and query performance of Dwarfs are influenced when increasing the $G_{min}$ threshold is investigated. Dwarf structures were created for the 8-dimension cubes of the $B_{uni}$ and $B_{80/20}$ datasets (see above) for different values of the $G_{min}$ parameter and then 8,000 queries were issued on each of the resulting Dwarf cubes. The description of the queries was the same as in the case of the rotated dimensions. Table 12 presents the creation times, the required storage, and the time required to execute all 8,000 queries for each Dwarf.

TABLE 12

Performance Measurements for Increasing $G_{min}$

| | Uniform Distribution | | | 80-20 Distribution | | |
|---|---|---|---|---|---|---|
| $G_{min}$ | Space (MB) | Construction (sec) | Queries (sec) | Space (MB) | Construction (sec) | Queries (sec) |
| 0 | 490 | 202 | 154 | 482 | 218 | 199 |
| 100 | 400 | 74 | 110 | 376 | 81 | 262 |
| 1,000 | 312 | 59 | 317 | 343 | 62 | 295 |
| 5,000 | 166 | 29 | 408 | 288 | 53 | 1,094 |
| 20,000 | 151 | 25 | 476 | 160 | 30 | 1,434 |

When one increases the value of $G_{min}$, the space that Dwarf occupies decreases, while at the same time query performance degrades. The only exception was for the Uniform distribution and $G_{min}$ value of 100, where the reduction of space actually improved query performance, despite the fact that some aggregations needed to be done on-the-fly. The reason is that coarse-grained areas for this value fit in one—or at most two—pages and it is faster to fetch them and do the aggregation on the fly, rather than fetching two or more pages to get to the precomputed aggregate.

In Table 12, the pay-off in construct time is even higher than the space savings. A $G_{min}$ value of 20,000 results in 3 to 1 storage savings, but in more than 7 to 1 speedup of computation times. After various experiments, a conclusion is reached that a value of $G_{min}$ between 100 and 1,000 typically provides significant storage/time savings with small degradation in query performance.

E. Updates

This section presents experimental results to evaluate the update performance of Dwarfs when compared to full and reduced Cubetrees.

1. Synthetic Dataset

In this experiment, the 8-dimension dataset $B_{uni}$ was employed. The Dwarf, the full Cubetrees and the reduced Cubetrees were constructed with 727,300 tuples and then proceeded to add 10 increments of 1% each (to reach the total of 800,000 tuples). The reduced Cubetrees were selected to have about the same size as the Dwarf cube when both are constructed using 727,300 tuples. Table 13 shows the update time for all 3 structures. One can clearly see that the full Cubetrees require significantly more time, since their size is much larger than that of the Dwarf structure. Dwarf performs better at the beginning when compared to the incremental updates of the reduced Cubetrees. For example, for the first incremental update, the reduced Cubetrees took 34% more time than Dwarf. As one updates the structures with more and more data, the difference in update times becomes smaller, and eventually Dwarf becomes more expensive to update incrementally. The main reason for this is the degradation of the Dwarf's clustering as nodes are expanded during updates, and overflow nodes are added to the structure. To demonstrate this, the same set of queries that were used in the previous experiment were run on the final Dwarf structure (after the 10 increments had been applied). Dwarf now required 211 seconds, 37% more time than the 154 seconds of the reorganized Dwarf. Cubetrees (according to the specification of the update algorithm (Y. Kotidis and N. Roussopoulos, "An Alternative Storage Organization for ROLAP Aggregate Views Based on Cubetrees," In Proceedings of the ACM SIGMOD International Conference on Management of Data, pages 249–258, Seattle, Wash., June 1998)) are always kept optimized by using new storage for writing the new aggregates. This results in having about twice the space requirements of Dwarf during updates, since the old structure is used as an input for the update process. The same technique can be implemented for Dwarf too. After a few increments, one can reorganize the dwarf structure with a background process that writes a new Dwarf into new storage, restoring its clustering. For example, if one reorganizes the Dwarf after the first 9 increments, the update time for the last increment is 82 seconds, which is faster than the corresponding update of the Cubetrees.

TABLE 13

Update Performance on Synthetic Dataset

| Action | Full Cubetrees | | Dwarf | | Reduced Cubetrees |
| | Time (sec) | Space (MB) | Time (sec) | Space (MB) | Time (sec) |
|---|---|---|---|---|---|
| Create | 1089 | 3063 | 180 | 446 | 296 |
| Update#1 | 611 | 3093 | 65 | 455 | 87 |
| Update#2 | 605 | 3123 | 68 | 464 | 84 |
| Update#3 | 624 | 3153 | 70 | 473 | 92 |
| Update#4 | 618 | 3183 | 73 | 482 | 86 |
| Update#5 | 631 | 3212 | 79 | 491 | 90 |
| Update#6 | 626 | 3242 | 81 | 499 | 87 |
| Update#7 | 636 | 3272 | 87 | 508 | 91 |
| Update#8 | 633 | 3301 | 98 | 517 | 88 |
| Update#9 | 651 | 3331 | 107 | 526 | 93 |
| Update#10 | 644 | 3361 | 121 | 535 | 90 |

2. Using the APB-1 Benchmark Data

The update performance of Dwarf was tested on the APB-1 benchmark (OLAP Council. APB-1 Benchmark. http://www.olapcouncil.org/research/bmarkco.htm, 1998), with the density parameter set to 8. The APB-1 benchmark contains a 4-d dataset with cardinalities 9000, 900, 17 and 9 and two measure attributes. The string data of the fact table was mapped to integers, and the fact table was randomly permuted. 90% of the tuples (22,386,000 tuples) were then selected to initially load the Cubetrees (full and reduced) and Dwarf, which were then subjected to 10 successive increments of 1% each. Table 14 shows the results for the reduced Cubetrees and Dwarf. The full Cubetrees are always more expensive to update than the reduced Cubetrees (since they have more views to update) and, thus, are not included in the results. Dwarf surpassed the reduced Cubetrees in all the incremental updates. Moreover, it is interesting to notice that the update time of Dwarf decreased as more tuples were inserted. This is mainly because this dataset corresponded to a dense cube and, therefore, the number of coalesced tuples was small. Updating coalesced tuples is the most time consuming part of the incremental update operation for Dwarf. As more tuples were inserted, fewer coalesced links existed, and the update performance improved.

TABLE 14

Update Performance on the APB-1 Benchmark

| #Action | Dwarf | | Reduced Cubetrees |
| | Time (sec) | Space (MB) | Time (sec) |
|---|---|---|---|
| Create | 1124 | 346 | 1381 |
| Update#1 | 42 | 350 | 76 |
| Update#2 | 36 | 353 | 78 |
| Update#3 | 39 | 359 | 77 |
| Update#4 | 34 | 365 | 79 |
| Update#5 | 24 | 369 | 80 |
| Update#6 | 34 | 374 | 82 |
| Update#7 | 24 | 378 | 79 |
| Update#8 | 30 | 384 | 83 |
| Update#9 | 22 | 390 | 82 |
| Update#10 | 20 | 393 | 84 |

VII. Related Considerations

As indicated above, the lattice representation (V. Harinarayan, et al., "Implementing Data Cubes Efficiently," In *Proc. of ACM SIGMOD*, pages 205–216, Montreal, Canada, June 1996) of the Data Cube is used to represent the computational dependencies between the group-bys of the cube (see FIG. 4 for an example for three dimensions. Each node in the lattice corresponds to a group-by (view) over the node's dimensions. For example, node ab represents the group-by (a, b) view. The computational dependencies among group-bys are represented in the lattice using directed edges. For example, group-by a can be computed from the ab group-by, while group-by abc can be used to compute any other group-by. In FIG. 4, only dependencies between adjacent group-bys are shown, but one refers to the transitive closure of this lattice. The goal of any algorithm that computes a cube is to take advantage of as much commonality between a parent and a child. The techniques that have been used include sharing partitions, sorts or partial sorts between group-bys with common attributes. More of the algorithms described below, assume that the cube is stored in unindexed relations.

The PIPESORT algorithm has been proposed (S. Agarwal et al., "On the computation of multidimensional aggregates." In *Proc. of the 22nd VLDB Conf.*, pages 506–521, 1996; S. Sarawagi et al., "On computing the data cube," Technical Report RJ10026, IBM Almaden Research Center, San Jose, Calif., 1996). The idea is to convert the cube lattice into a processing tree and compute every group-by from the smallest parent. The main limitation of PIPESORT is that it does not scale well with respect to the number, d, of dimensions (the number of sorts required are exponential on d). When computing sparse cubes, many of the intermediate sorts, are larger than the available memory, so external sort is used. This results to PIPESORT performing a considerable amount of I/O.

The OVERLAP algorithm, proposed by Deshpande et al. (P. M. Deshpande et al., "Computation of multidimensional aggregates." Technical Report 1314, University of Wisconsin—Madison, 1996), overlaps the computation of the cuboids by using partially matching sort orders, in order to reduce the number of sorting steps required. For example, OVERLAP uses the sorted abc group by, in order to produce the ac sort order. It does this by sorting independently each one of the |a| partitions of abc on c. OVERLAP chooses a sort order for the root of the lattice and then the attributes at each node of the search lattice are ordered to be sub-sequences of this sort order. Then the algorithm prunes edges from the search lattice and converts it to a tree. More specifically, among the various parents of a node the one selected is the one that shares the longest prefix in the attribute ordering of the node. Once a tree is constructed, OVERLAP fits as many partitions in memory as possible to avoid writing intermediate results. However, OVERLAP on sparse cubes can still produce a large amount of I/O. In K. A. Ross and D. Srivastana, Fast Computation of Sparse Datacubes," In Proc of the $23^{rd}$ VLDB Conf., Pages 116–125, Athens, Greece, 1997, the authors argue that the complexity is quadratic on the number of dimensions.

In J. Gray et al., "Data Cube: A Relational Aggregation Operator Generalizing Group-By, Cross-Tab, and Sub-Totals;" In *Proc. of the 12th ICDE*, pages 152–159, New Orleans, February 1996. IEEE, a main memory algorithm is proposed where all the tuples are kept in memory as a d-dimensional array, where d is the number of dimensions. Unfortunately the structures often do not fit in memory for sparse relations even when the relation itself does. In Y. Zhao, P. M. Deshpande, and J. F. Naughton; "An array-based algorithm for simultaneous multidimensional aggregates;" In *Proc. of the ACM SIGMOD Conf.*, pages 159–170, 1997, another array-based algorithm is proposed. The algorithm is very similar to OVERLAP, except that it uses memory-arrays to store partitions and to avoid sorting. It "chunks" the d-dimensional array to a d-dimensional sub-array that corresponds to a page. The array is stored in units of chunks to provide clustering. Sparse chunks are compressed. Unfortunately if the data is too sparse, the in-memory arrays become too large for the main memory and the method becomes in-feasible.

The algorithms proposed in K. A. Ross and D. Srivastana, "Fast Computation of Sparse Datacubes," In *Proc. of the 23rd VLDB Conf.*, pages 116–125, Athens, Greece, 1997 are designed to work together and target sparse cubes. PartitionCube partitions the data into units that can fit in main memory and then MemoryCube is called for each unit in order to compute the cube. The authors observe that buffering intermediate results requires too much memory for sparse cubes and choose to buffer only the partitioned units for repeated in-memory sorts. MemoryCube picks the minimum number of sorts required to compute the cube that corresponds to one in-memory unit.

The Bottom-Up Cube (BUC) algorithm is described in K. Beyer and R. Ramakrishnan, "Bottom-Up Computation of Sparse and Iceberg CUBEs," In *Proc. of the ACM SIGMOD Conf.*, pages 359–370, Philadelphia, Pa., USA, 1999, and is designed to compute sparse and Iceberg-cubes. The general Iceberg-cube problem is to compute all group-by partitions for every combination of grouping attributes that satisfy an aggregate selection condition. Iceberg-cubes can be used to compute iceberg-queries (M. Fang et al., "Computing Iceberg Queries Efficiently," In *Proc. of the 24th VLDB Conf.*, pages 299–310, August 1998). For Iceberg cubes, BUC stores only those partitions of a group-by whose value is produced by aggregating at least N tuples of the fact table. The parameter N is called the minimum support (MinSup). Sparse Iceberg cubes are much smaller than the full cubes, because the minimum support pruning has a direct effect on the number of views materialized. Assume a cube with 10 dimensions each with a cardinality 1000 and a fact table of 1,000,000 tuples uniformly distributed. A minimum support of 10 materializes only views with 3 dimensions or less. The other views contain group-bys with partitions less than the minimum support.

Recently, work has been performed on approximating Data Cubes through various forms of compression such as wavelets (J. S Vitter et al., "Data Cube Approximation and Histograms via Wavelets," In *Proc. of the 7th Intl. Conf. Information and Knowledge Management (CIKM'98)*, 1998)), multivariate polynomials (D. Barbara et al., "A Space-Efficient way to support Approximate Multidimensional Databases," Technical report, ISSE-TR-98-03, George Mason University, 1998), or by using sampling (P. B. Gibbons and Y. Matias. New Sampling-Based Summary Statistics for Improving Approximate Query Answers. In Proceedings ACM SIGMOD International Conference on Management of Data, pages 331–342, Seattle, Wash., June 1998; S. Acharya, P. B. Gibbons, and V. Poosala. Congressional Samples for Approximate Answering of Group-By Queries. In Proceedings of ACM SIGMOD International Conference on Management of Data, pages 487–498, Dallas, Tex., 2000) or data probability density distributions (J. Shanmugasundaram et al., "Compressed Data Cubes for OLAP Aggregate Query Approximation on Continuous Dimensions," In *Proc. of the Intl. Conf. on Knowledge*

*Discovery and Data Mining* (KDD99), 1999). While these methods can substantially reduce the size of the Cube, they do not actually store the values of the group-bys, but rather approximate them, thus they do not provide accurate results.

A different type of redundancy has also been exploited (Y. Kotidis and N. Roussopoulos, "An Alternative Storage Organization for ROLAP Aggregate Views Based on Cubetrees," In Proceedings of the ACM SIGMOD International Conference on Management of Data, pages 249–258, Seattle, Wash., June 1998; N. Roussopoulos, et al., "Cubetree: Organization of and Bulk Incremental Updates on the Data Cube," In Proceedings of the ACM SIGMOD International Conference on Management of Data, pages 89–99, Tucson, Ariz., May 1997). In such work, the multidimensional subspaces are mapped into orthogonal hyperplanes which have no interleaving points. This allows for factoring out the common but constant coordinates of these hyperplanes. Common sort orders are then used to cluster the points of each group-by into continuous disk space. A packing algorithm guarantees full page utilization, resulting in at least 50% space savings over indexed relations. Updates are handled through a Merge-Packing algorithm that scans the old aggregates and merges them with the update increment, which is sorted in compatible order.

In Lixin Fu and Joachim Hammer. CUBIST: A New Algorithm for Improving the Performance of Ad-hoc OLAP Queries. In DOLAP, 2000, the idea of a statistics tree (ST) was introduced. In this tree, prefix redundancy was partially exploited. Unique suffixes were stored just once, but the tree contained all possible paths (even paths corresponding to tuples that have not been inserted) making it inappropriate for sparse datasets. Moreover, the construction algorithm of the ST did not exploit data locality and clustering, thus resulting in inefficient cube computation.

In Wei Wang, Hongjun Lu, Jianlin Feng, and Jeffrey Xu Yu. Condensed Cube: An Effective Approach to Reducing Data Cube Size. In ICDE, 2002, three algorithms are described for discovering tuples whose storage can be coalesced: Compared to such work, the present invention provides a much more efficient method which also indexes the produced cube, something also not done by most of the methods for cube computation listed above.

In sum, the present invention provides a database storage organization architecture (termed "Dwarf"). Dwarf is the first structure that exploits prefix and suffix structural redundancies found in high dimensionality full and concatenated rollup cubes to "dwarf" their store and compute time. Prefix redundancies had been exploited in earlier work to reduce compute time, however, suffix redundancy has not been previously identified or exploited. The Dwarf structure shows that suffix redundancy is the dominant factor in sparse cubes and its elimination has the highest return. Dwarf is practical because it requires no deep knowledge on the data and the value distributions. It is scalable because the higher the dimensions the more the redundancy to harvest. The development of Dwarf permits one to aggregate high dimensional data into manageable cube store sizes and decreases compute times. Because Dwarfs capture the full precision of the datacube structure and algorithms for creating it, the development of Dwarf eliminates the past need for lossy representations of cubes.

The methods of prefix expansion and suffix coalescing described herein can dramatically shrink the required storage for a cube as well as its creation time. The savings from prefix expansion are large for dense areas of the cube, while the savings from suffix coalescing are even larger for sparse areas. The implicit hierarchical structure of the Dwarf provides an indexing structure which makes queries very fast. The proposed algorithms have low memory requirements and allow computing cubes even at low-end machines. Dwarf computes the full cube without throwing away anything, and this is done with a minimum level of human interaction In the experiments, the scalability of the approach of the present invention to very high dimensional cubes is shown. The efficient exploitation of the sparsity of the cube translates to exponential savings over the relational storage footprint (BSF), i.e. the space required if the cube is stored in unindexed relations. The experiments further demonstrate that the savings behave well with increasing fact table sizes. Skewed datasets are used to show the adaptation of Dwarf to cubes with non-uniform densities. Real datasets with very high dimensionality and correlated dimensions show that using Dwarf is both practical and efficient.

All publications and patent applications and patents mentioned in this specification are herein incorporated by reference to the same extent as if each individual publication or patent application had been specifically and individually indicated to be incorporated by reference. The discussion of the background to the invention herein is included to explain the context of the invention. Such explanation is not an admission that any of the material referred to was published, known, or part of the prior art or common general knowledge anywhere in the world as of the priority date of any of the aspects listed above. While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A computer-implemented method for increasing the storage efficiency of either (1) a computer main memory or (2) a computer-readable disk memory, wherein said method comprises: analysing an initial datacube of said data; identifying suffix redundancies in said datacube; producing a coalesced and reduced-in-size datacube based on the identified suffix redundencies that is capable of answering a query with the full precision of the initial datacube; and, storing said data in either said memory (1) or (2) as said reduced-in-size datacube to decrease the size of the memory required to store said data and increase the store efficiency of such memory.

2. The method of claim 1, wherein said method comprises additionally analysing said initial datacube of said data to identify prefix redundancies in said data, and exploiting any identified prefix redundancies in said initial datacube in an interleaved fashion to produce said coalesced and reduced-in-size datacube that is capable of answering a query with the full precision of the initial datacube.

3. A computer-implemented method for increasing the storage efficiency of a computer-readable storage medium, wherein said method comprises the steps of:
 (A) sampling data to be stored to estimate cardinalities or correlations between dimensions of said data and ordering the dimensions accordingly;
 (B) sorting said data according to the dimension ordering acquired by step (A);
 (C) assigning one level of a Dwarf structure, moving top-down:

(1) for a full data cube, to each hierarchy level of the dimensions, according to the dimension ordering, and the hierarchy-level ordering within each dimension; and (2) for a concatenated rollup cube, to each dimension, according to the dimension ordering; wherein each level consists of multiple rollup representations whose number is equal to the number of hierarchy levels of the dimension; wherein exactly one rollup representation is assigned to each hierarchy level of the dimension; wherein the rollup representations are ordered from the one corresponding to the most detailed hierarchy level to the one corresponding to the least detailed hierarchy level;

(D) inserting data in nodes one tuple at a time; and (E) storing said data in said computer-readable storage medium as a reduced-in-size datacube to decrease the amount of computer memory needed to store said data and increase the store e efficiency of such memory.

4. The method of claim 3, wherein in said step (C)(1), for each dimension representing a hierarchy, data is ordered with primary key being the value of the most general level, and proceeding to most specific levels for the case of the full data cube; wherein each dimension is expanded in the fact table into as many data values, as the number of its hierarchy levels.

5. The method of claim 3, wherein said step (D) comprises the sub-steps of:

(1) creating nodes and cells in a path from the Dwarf structure's root to a leaf node;

(2) storing the tuple's aggregates in a cell of a leaf node, wherein if the cell already existed, the new values are aggregated with the already stored ones; and (3) for nodes that will receive no more input data, calculating their aggregates values.

6. The method of claim 3, wherein in step (C)(1), for each dimension representing a hierarchy, data is ordered with primary key being the value of the most general level, and proceeding to most specific levels.

7. The method of claim 5, wherein in step (D)(3), said calculation of aggregate values is accomplished by merging previously calculated aggregate values, or by first sorting the corresponding tuples and then processing them accordingly, wherein aggregate values that correspond to different aggregates (group-bys), but which contain identical aggregate values, are identified and their storage is coalesced.

8. The method of claim 3, wherein root-to-leaf paths in the Dwarf structure represent keys for identifying data records.

9. The method of claim 3, wherein each key represents either a value of a hierarchy level of a dimension, or all the values of the dimension's hierarchy level.

10. The method of claim 3, wherein the data identified by keys represented by a root-to-leaf path in Dwarf structure is the aggregates of all the data records that match the attribute values of the path.

11. The method of claim 3, wherein group-bys that aggregate values along at least one hierarchy level of any dimension are produced by merging previously calculated aggregate values.

12. The method of claim 3, wherein different sets of group-bys that are calculated from the same input data are identified, said identified sets of different group-bys being suffix redundancies.

13. The method of claim 12, wherein said calculation uses the SuffixCoalesce algorithm.

14. The method of claim 12, wherein said calculation uses the SuffixCoalesceWithSort algorithm.

15. The method of claim 12, wherein said calculation uses the HybridSuffixCoalesce algorithm.

16. The method of claim 11, wherein said calculation uses the SuffixHierarchies algorithm.

17. The method of claim 3, wherein the storage of different group-bys that are calculated from the same input data is coalesced, and their suffix redundancy is therefore eliminated.

18. A data storage device comprising a computer-readable store e medium in which data has been stored in a Dwarf data structure to increase the storage efficiency of said medium, said structure comprising:

(A) a full data cube, wherein the structure of said full data cube contains as many levels as the sum of all the hierarchy levels of all the dimensions of the stored data; wherein:

(1) exactly one level of the structure is assigned to each hierarchy level of the dimensions; and (2) nodes at each level contain cells; wherein each cell of a non-leaf node consists of a key value and a pointer to a node of the next lower level; and wherein each cell of a leaf-node comprises a key value and the desired aggregate values; and wherein each node also contains a special ALL cell, the ALL cell corresponding to all the keys of the node; wherein ALL cells of non-leaf nodes contain pointers to the next lower level, and ALL cells of leaf nodes contain aggregate values;

or (B) a concatenated rollup datacube, wherein the structure of said concatenated rollup datacube contains as many levels as the number of the dimensions of the stored data; and wherein:

(1) exactly one level of the structure is assigned to each dimension;

(2) each level consists of multiple "rollup representations", whose number is equal to the number of hierarchy levels of the dimension; wherein exactly one rollup representation is assigned to each hierarchy level of the dimension; wherein the rollup representations are ordered from the one corresponding to the most detailed hierarchy level to the one corresponding to the least detailed hierarchy level; and (3) nodes at each level contain cells; wherein each cell of a non-leaf node consists of a key value and a pointer to a node of the next lower level; and wherein each cell of a leaf-node comprises a key value and the desired aggregate values; and wherein each node also contains a special ALL cell, the ALL cell corresponding to all the keys of the node; wherein ALL cells of nodes in the last rollup representation contain aggregate values of the stored data when they belong to the last level, or a pointer to a node at the next level otherwise; and wherein ALL cells of nodes not in the last rollup representation contain pointers to a node in the next rollup representation of the current levels;

wherein said Dwarf data structure reduces the amount of computer-readable storage medium required to store said data, relative to the amount of computer-readable storage medium that would otherwise be required to store said data, thereby increasing the storage efficiency of said computer-readable store e medium.

19. The computer-implemented data storage device of claim 18, wherein said data structure is constructed by inserting one tuple at a time, according to the sub-steps of:

(A) creating nodes and cells in a path from the Dwarf structure's root to a leaf node;

(B) storing the tuple's aggregates in a cell of a leaf node, wherein if the cell already existed, the new values are aggregated with the already stored ones; and (C) For nodes that will receive no more input data, calculating their aggregates values.

20. The computer-implemented data storage device of claim 19, wherein in step (C), said calculation of aggregate values is accomplished by merging previously calculated aggregate values, or by first sorting the corresponding tuples and then processing them accordingly, wherein aggregate values that correspond to different aggregates (group-bys), but which contain identical aggregate values, are identified and their storage is coalesced.

21. The computer-implemented data storage device of any of claims 19 or 20, wherein said device additionally samples input data to estimate the cardinality of each dimension and orders the dimensions according to decreasing cardinalities.

22. The computer-implemented data storage data storage device of any of claims 19 or 20, wherein said device additionally calculates group-bys that aggregate values across at least one hierarchy level by merging previously calculated aggregate values.

23. The computer-implemented data storage device of any of claims 19 or 20, wherein said device additionally organizes key values of cells within a node in a sorted list, which becomes a B$^+$-tree if the number of keys exceeds a user-specified threshold.

24. The computer-implemented data storage device of claim 23, wherein said device additionally coalesces the store of organized different sets of group-bys and eliminates their suffix redundancy.

25. The computer-implemented data storage device of any of claims 19 or 20, wherein said device additionally identifies different sets of group-bys that can be calculated from the same input data and which contain the same aggregate values.

26. A computer comprising:

(A) a computer-readable storage medium in which data has been stored in a Dwarf data structure to increase the storage efficiency of said medium; and (B) means for analysing the stored data;

(1) to estimate the cardinality of each dimension of said data and order the estimated dimensions according to decreasing cardinalities;

(2) to calculate group-bys that aggregate values across at least one hierarchy level by merging previously calculated aggregate values;

(3) to organize key values of cells within a node in a sorted list, which becomes a B+-tree if the number of keys exceeds 2 disk pages;

(4) to organize different sets of group-bys that can be calculated from the same input data and which, therefore, contain the same aggregate values; and (5) to coalesce the store of different sets of group-bys that are identified in (4) thus eliminating suffix redundancy of said different sets of group-bys that are identified in (4);

wherein said Dwarf data structure and said means reduce the amount of computer-readable storage medium required to store said data, relative to the amount of computer-readable storage medium that would otherwise be required to store said data, thereby increasing, the storage efficiency of said computer.

27. The computer of claim 26, wherein said Dwarf data structure is a full datacube that contains as many levels as the sum of all the hierarchy levels of all the dimensions of the stored data, wherein:

(1) exactly one level of the structure is assigned to each hierarchy level of the dimensions;

(2) nodes at each level contain cells; wherein each cell of a non-leaf node consists of a key value and a pointer to a node of the next lower level; and wherein each cell of a leaf-node comprises a key value and the desired aggregate values; and (3) each node also contains a special ALL cell, said ALL cell corresponding to all the keys of the node; wherein ALL cells of non-leaf nodes contain pointers to the next lower level, and ALL cells of leaf nodes contain aggregate values.

28. The computer of claim 26, wherein said Dwarf data structure is a concatenated rollup datacube that contains as many levels as the number of the dimensions of the stored data; wherein:

(1) exactly one level of the structure is assigned to each dimension;

(2) each level consists of multiple rollup representations, whose number is equal to the number of hierarchy levels of the dimension; wherein exactly one rollup representation is assigned to each hierarchy level of the dimension; wherein the rollup representations are ordered from the one corresponding to the most detailed hierarchy level to the one corresponding to the least detailed hierarchy level; and (3) nodes at each level contain cells; wherein each cell of a non-leaf node consists of a key value and a pointer to a node of the next lower level; and wherein each cell of a leaf-node comprises a key value and the desired aggregate values; and wherein each node also contains a special ALL cell, the ALL cell corresponding to all the keys of the node; wherein ALL cells of nodes in the last rollup representation contain aggregate values of the stored data when they belong to the last level, or a pointer to a node at the next level otherwise; and wherein ALL cells of nodes not in the last rollup representation contain pointers to a node in the next rollup representation of the current level.

29. The computer of any of claims 27 or 28, wherein said Dwarf data structure is constructed by inserting one tuple at a time.

30. The computer of claim 29, wherein said tuple being inserted is inserted according to the sub-steps of:

(A) creating nodes and cells in a path from the Dwarf structure's root to a leaf node;

(B) storing the tuple's aggregates in a cell of a leaf node, wherein if the cell already existed, the new values are aggregated with the already stored ones; and (C) For nodes that will receive no more input data, calculating their aggregates values.

31. The computer of claim 30, wherein in sub-step (C), said calculation of aggregate values is accomplished by merging previously calculated aggregate values, or by first sorting the corresponding tuples and then processing them accordingly, wherein aggregate values that correspond to different aggregates (group-bys), but which contain identical aggregate values, are identified and their storage is coalesced.

32. The computer of claim 26, wherein estimates of the dimensions' cardinalities are acquired by sampling the input data.

33. The computer of claim 26, wherein a dimension ordering is created based on the acquired estimates.

34. The computer of claim 26, wherein the input data are sorted according to an acquired dimension ordering.

35. The computer of claim 26, wherein the input data is inserted in the Dwarf structure.

36. The computer of claim 26, wherein aggregate values are calculated by merging previously calculated values, whenever possible.

37. The computer of claim 26, wherein suffix redundancies are identified and their storage is coalesced.

38. The computer of claim 26, wherein the calculation of a sub-dwarf of the ALL cell of a node N is accomplished through the use of either the SuffixCoalesce, SuffixCoalesceWithSort, HybridSuffixCoalesce or HierarchiesCoalesce algorithm by estimating whether the sub-dwarfs to be merged are currently stored in the system's buffers.

39. The computer of claim 26, wherein for each non-leaf node N at level i of a D-level Dwarf, the aggregate value V obtained by following from node N ALL cells until V is reached can be copied to the ALL cell of node N.

40. The computer of claim 39, wherein the Dwarf structure is queried, and the aggregate values for any specified group-by are retrieved.

41. The computer of claim 26, wherein the Dwarf structure is bulk-updated by using a merge-pack algorithm.

42. The computer of claim 26, wherein the Dwarf structure is updated by using an incremental update algorithm.

43. The computer of claim 26, wherein the Dwarf structure is updated by using a Dwarf reconstruction algorithm.

44. A computer-implemented method for increasing the efficiency of retrieving the aggregate values that correspond to any specified group-by of data stored in a computer-readable medium, wherein said method comprises the steps of:
- (A) querying data that has been stored in said computer-readable medium in a Dwarf data structure formed by:
  - (1) analysing data to estimate the cardinality of each dimension of said data and ordering the estimated dimensions according to decreasing cardinalities;
  - (2) calculating group-bys that aggregate values across at least one hierarchy level by merging previously calculated aggregate values;
  - (3) organizing key values of cells within a node in a sorted list, which becomes a B+-tree if the number of keys exceeds 2 disk pages;
  - (4) organizing different sets of group-bys that can be calculated from the same input data and which, therefore, contain the same aggregate values;
  - (5) coalescing the store of different sets of group-bys that are identified in (4), thus eliminating suffix redundancy of said different sets of group-bys that are identified in (4); and
  - (6) employing said coalesced store of different sets of group-bys to form said Dwarf data structure; and
- (B) retrieving the aggregate values that correspond to any specified group-by of stored data;

wherein said Dwarf data structure reduces the amount of computer-readable storage medium required to store said data relative to the amount of computer-readable store medium that would otherwise be required to store said data, thereby increasing the efficiency of retrieving said aggregate values that correspond to any specified group-by of stored data.

45. A computer-implemented method for increasing the efficiency of updating old data stored in a computer-readable storage medium, wherein said data is stored in an old Dwarf datacube structure, wherein said method comprises the steps of:
- (A) creating a Delta-Dwarf datacube structure for the update data, by:
  - (1) sampling input data to estimate the cardinality of each dimension and orders the dimensions according to decreasing cardinalities;
  - (2) calculating group-bys that aggregate values across at least one hierarchy level by merging previously calculated aggregate values;
  - (3) organizing key values of cells within a node in a sorted list, which becomes a B+-tree if the number of keys exceeds 2 disk pages and coalescing the store of organized different sets of group-bys thereby eliminating their suffix redundancy; and
  - (4) identifying different sets of group-bys that can be calculated from the same input data and which contain the same aggregate values; and
- (B) merging the Delta-Dwarf datacube structure with the old Dwarf datacube structure using a merge-packing algorithm;

wherein by creating said Delta-Dwarf datacube structure and merging its content with that of said old Dwarf datacube structure, said method increases the efficiency of data updating, relative to the time that would otherwise be required to update said data.

46. A computer-implemented method for increasing the efficiency of performing an incremental update to data stored in a computer-readable medium, wherein said data is stored in an existing Dwarf datacube structure, and wherein said method comprises the steps of:
- (1) Ordering the dimensions of the update data according to the dimension ordering of said existing Dwarf datacube;
- (2) Traversing the old Dwarf structure top-down to identify nodes that need to be updated due to the existence of update tuples; wherein a node at a level L of the Dwarf structure needs to be updated if and only if at least one update tuple contains a prefix of length L-1 that is identical to the path followed from the root of the structure to the current node, and wherein each node also contains a special ALL cell, the ALL cell corresponding to all the keys of the node;
- (3) Updating any node N at the lowest level of the structure by:
  - (a) Identifying whether the update tuples that influence the aggregate values stored in N will require the insertion of new key values in N; and
  - (b) Creating a new node to store the results if the process in step (a) shows that new keys need to be inserted to N, otherwise storing the results in N;
  - (c) For each key in the resulting node, merging the aggregate values existing in N with those of the update tuples;
  - (d) Calculating the aggregate values for the ALL cell; and
- (4) Updating any node N at higher levels by a method comprised of:
  - (a) Recursively propagating the update procedure to the nodes pointed by the cells of N; and
  - (b) Merging the resulting updated dwarfs to calculate the ALL cell of the node;

to thereby accomplish the incremental updating of said existing Dwarf datacube structure;

wherein by updating said data in said Dwarf data structure, the amount of computer-readable storage medium required to update said data is reduced, relative to the amount of computer-readable storage medium that would otherwise be required to update said data, thereby increasing the efficiency of performing said incremental update of said data.

47. A computer-implemented method for increasing data updating efficiency by updating an existing Dwarf datacube structure stored in a computer-readable storage medium into a new Dwarf datacube structure, wherein said method comprises causing a computer to implement a reconstruct algorithm comprised of the steps of:

(A) Extracting the tuples of the old Dwarf by performing a query on the most detailed hierarchy level of each dimension, requesting all possible values;

(B) Ordering the data in the update tuples according to the dimension ordering in the existing Dwarf;

(C) Merging the tuples acquired from steps (A) and (B); and (D) Employing said merged tuples to construct a new Dwarf datacube structure; and (E) Storing said new Dwarf datacube structure in a computer-readable storage medium, to thereby accomplish the incremental updating of said existing Dwarf datacube structure;

wherein said method increases the efficiency of performing said update of said data, relative to the efficiency of updating said data if not stored in a Dwarf data cube structure.

48. The method of any of claims 1 or 2, wherein said query is a drill down query.

49. The method of any of claims 1 or 2, wherein said query is a roll-up query.

* * * * *